(12) United States Patent
Jin et al.

(10) Patent No.: US 10,513,616 B2
(45) Date of Patent: Dec. 24, 2019

(54) SUNLIGHT REFLECTING MATERIALS AND METHODS OF FABRICATION

(71) Applicant: The Regents of the University of California, Oakland, CA (US)

(72) Inventors: Sungho Jin, San Diego, CA (US); Chulmin Choi, San Diego, CA (US); Jaeyun Moon, San Diego, CA (US); Taekyoung Kim, La Jolla, CA (US); Ratneshwar Lal, La Jolla, CA (US); Kyungjun Hwang, San Diego, CA (US); Gunwoo Kim, La Jolla, CA (US); Youngjin Kim, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/316,301

(22) PCT Filed: Jun. 8, 2015

(86) PCT No.: PCT/US2015/034718
§ 371 (c)(1),
(2) Date: Dec. 5, 2016

(87) PCT Pub. No.: WO2015/188190
PCT Pub. Date: Dec. 10, 2015

(65) Prior Publication Data
US 2017/0226347 A1    Aug. 10, 2017

Related U.S. Application Data

(60) Provisional application No. 62/009,052, filed on Jun. 6, 2014.

(51) Int. Cl.
*C09D 5/33* (2006.01)
*D06M 11/83* (2006.01)
(Continued)

(52) U.S. Cl.
CPC ............. *C09D 5/004* (2013.01); *B05D 5/063* (2013.01); *D06M 11/38* (2013.01); *D06M 11/42* (2013.01);
(Continued)

(58) Field of Classification Search
None
See application file for complete search history.

(56) References Cited

U.S. PATENT DOCUMENTS

2003/0013369 A1* 1/2003 Soane .................. D06M 16/00
442/181
2004/0216641 A1 11/2004 Hamada et al.
(Continued)

OTHER PUBLICATIONS

International Search Report and Written Opinion of International Application No. PCT/US2015/034718; dated Nov. 6, 2015, 12 pages.

*Primary Examiner* — Jeffrey D Washville
(74) *Attorney, Agent, or Firm* — Perkins Coie LLP

(57) ABSTRACT

Disclosed are nanostructured materials that reflect light in selected spectra incorporated in dark colored textiles or substrates. In one aspect, a light reflecting material includes a textile exhibiting a dark color and formed of a plurality of fibers, and nanostructures arranged on the fibers and formed of a plurality of nanoparticles, the nanostructures having a dimension size of substantially less than ½ of a visible light wavelength, in which the nanostructures reflect light from the textile or substrate in at least one of infrared, near-infrared, or red visible light spectra.

15 Claims, 13 Drawing Sheets

(51) Int. Cl.
| | |
|---|---|
| *D06M 13/513* | (2006.01) |
| *D06M 11/45* | (2006.01) |
| *G02B 1/10* | (2015.01) |
| *D06M 11/46* | (2006.01) |
| *D06M 11/42* | (2006.01) |
| *D06M 11/49* | (2006.01) |
| *D06M 11/47* | (2006.01) |
| *G02B 5/08* | (2006.01) |
| *B05D 5/06* | (2006.01) |
| *D06M 11/79* | (2006.01) |
| *D06M 11/38* | (2006.01) |
| *D06M 11/44* | (2006.01) |
| *D06M 11/48* | (2006.01) |
| *D06M 23/08* | (2006.01) |

(52) U.S. Cl.
CPC ............ *D06M 11/44* (2013.01); *D06M 11/45* (2013.01); *D06M 11/46* (2013.01); *D06M 11/47* (2013.01); *D06M 11/48* (2013.01); *D06M 11/49* (2013.01); *D06M 11/79* (2013.01); *D06M 11/83* (2013.01); *D06M 13/513* (2013.01); *D06M 23/08* (2013.01); *G02B 1/10* (2013.01); *G02B 5/0816* (2013.01); *D06M 2200/25* (2013.01)

(56) References Cited

U.S. PATENT DOCUMENTS

| | | |
|---|---|---|
| 2005/0215164 A1 | 9/2005 | Mueller et al. |
| 2005/0229328 A1 | 10/2005 | Tran |
| 2009/0084530 A1 | 4/2009 | Shuy |
| 2010/0004398 A1 | 7/2010 | Wang et al. |
| 2014/0118815 A1 | 5/2014 | Cho |
| 2014/0154324 A1 | 6/2014 | Waldofner et al. |

* cited by examiner

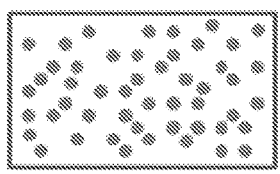
FIG 15(a)
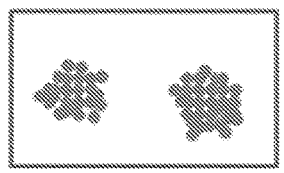
FIG 15(b)
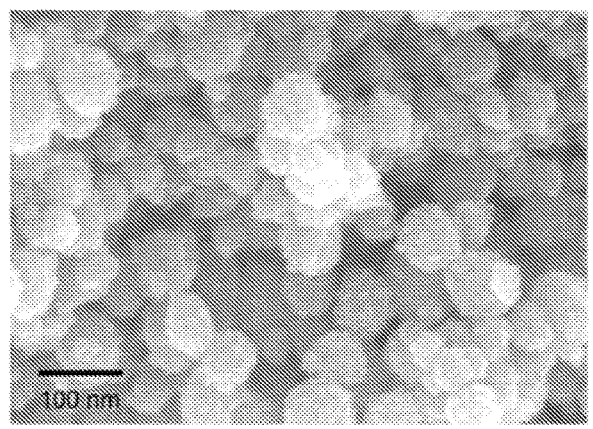
FIG 15(c)
FIG. 15
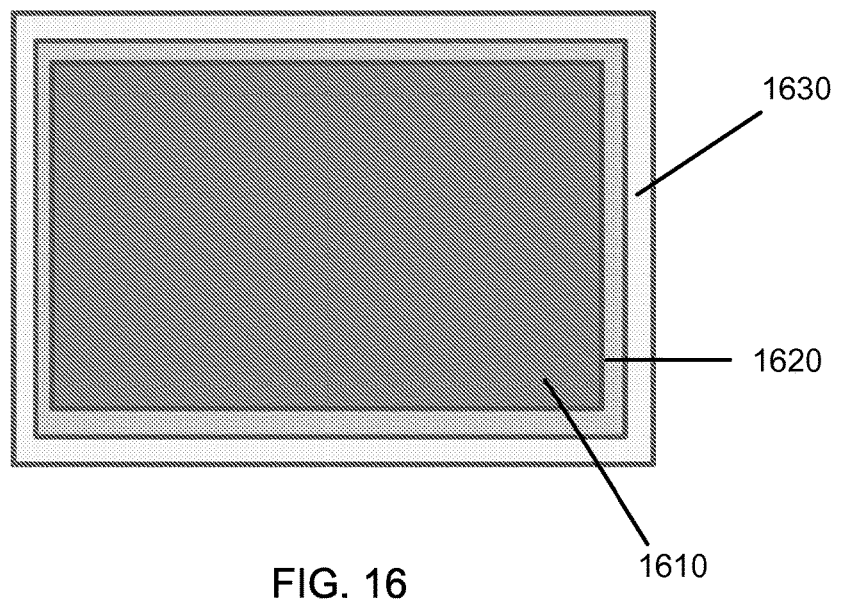
FIG. 16

FIG 17(a)
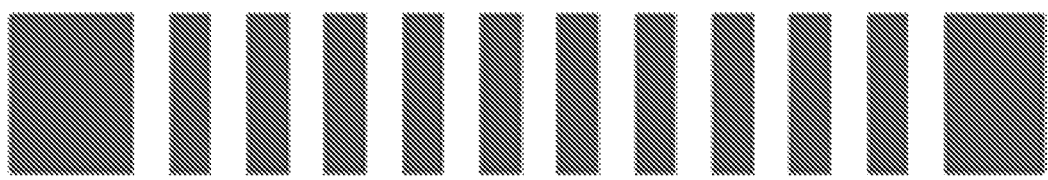
FIG 17(b)
FIG. 17

SUNLIGHT REFLECTING MATERIALS AND METHODS OF FABRICATION

CROSS-REFERENCE TO RELATED APPLICATIONS

This patent document is a 35 USC § 371 National Stage application of International Application No. PCT/US2015/034718, entitled "SUNLIGHT REFLECTING MATERIALS AND METHODS OF FABRICATION," which claims benefit of priority of U.S. Provisional Patent Application No. 62/009,052, entitled "SUNLIGHT REFLECTING MATERIALS AND METHODS OF FABRICATION" and filed on Jun. 6, 2014. The entire contents of the aforementioned patent applications are incorporated by reference as part of the disclosure of this patent document.

TECHNICAL FIELD

This patent document relates to nanoscale materials and nanotechnologies.

BACKGROUND

Nanotechnology provides techniques or processes for fabricating structures, devices, and systems with features at a molecular or atomic scale, e.g., structures in a range of one to hundreds of nanometers in some applications. For example, nano-scale devices can be configured to sizes similar to some large molecules, e.g., biomolecules such as enzymes. Nano-sized materials used to create a nanostructure, nanodevice, or a nanosystem that can exhibit various unique properties, e.g., including optical properties, that are not present in the same materials at larger dimensions and such unique properties can be exploited for a wide range of applications.

SUMMARY

Techniques, systems, and devices are disclosed for fabricating and implementing nanostructured materials that reflect light in the near infrared or infrared spectra incorporated in dark colored textiles or substrates. Some implementations of the disclosed technology provide sunlight-reflecting structures applicable to various applications including fabric applications and electrical equipment of which temperature needs to be not much affected by heat absorption.

In one aspect, a light reflecting material includes a textile exhibiting a dark color and formed of a plurality of fibers, and nanostructures arranged on the fibers and formed of a plurality of nanoparticles, the nanostructures having a dimension size of substantially less than ½ of a visible light wavelength and an interparticle spacing of at least one half of an average nanoparticle diameter, in which the nanostructures reflect light from the textile in at least one of infrared, near-infrared, or red visible light spectra.

The material can be implemented in various ways to include one or more of the following features. For example the nanostructures can be substantially invisible to naked eyes. The light spectral range can include at least one of infrared, near-infrared, or red visible light. The nanoparticles can include metal nanoparticles including one or more of Ag, Au, or Pd. The nanoparticles can include ceramic nanoparticles including $Al_2O_3$, AZO (aluminum-doped zinc oxide), $SiO_2$, $TiO_2$, $ZrO_2$, CaO, MgO, CuO, NiO, SnO, $SnO_2$, $V_2O_5$, or $Cr_2O_3$, rare earth oxide, or a mixture of ceramics or doped ceramics. The material can include an adhesion enhancing material having a silane structure (Si(OEt)3). The silane structure can contain carbon and can provide sufficiently long chain molecules that provide a space for bonding the nanoparticles to be attached to a rough substrate. The carbon-containing silane structure can have an added number of carbon atoms in the structure of silane compound in the range of 1 to 20. The carbon-containing silane structure can be selected from 1,2-bis(triethoxyslilyl) ethane or 1,6-bis trichlorosilyl hexane. The nanostructures configured to reflect light can include a sunlight or infrared (IR) reflecting coating that exhibits a high durability of the nanoparticles adherence with one of at most 20% loss, at most 10% loss, or at most 5% loss of the adhered nanoparticles after repeated washing or repeated rubbing, with corresponding loss of superhydrophobic contact angle being one of at most 30 degrees, at most 15 degrees, or at most 5 degrees. The at most 10% loss is more preferred than the at most 20% loss and the at most 5% loss is more preferred than the at most 10% loss. The at most 15 degrees contact angle is more preferred than the at most 30 degrees contact angle and the at most 5 degrees contact angle is more preferred than the at most 15 degrees contact angle.

In some implementations, the material can be implemented in various ways to include one or more of the following features. The nanostructures can include non-novel metal nanoparticles having core-shell structures, each core-shell structure having a core metal material and a shell protective material. The core metal material can include Ni, Co, Ti, Al, Mo, Zr, Ta, or W and the shell protective material can include oxidation-resistant material including $Cr_2O_3$, $Al_2O_3$, $ZrO_2$, $HfO_2$, $Ta_2O5$, $Y_2O_3$, ZnO, MgO, CaO, CrN, AlN, ZrN, or fluorides layer, or polymeric material including PDMS (Polydimethylsiloxane), PMMA (Poly(methyl methacrylate)), PS (Polystyrene), PTFE (Polytetrafluoroethylene), or epoxy material. The core metal material can have a round or flaky geometry. The core metal material with the round geometry can have a diameter less than 350 nm and the core metal material with the flaky geometry can have an elongation less than 5 um and a width with less than 1 um. The average thickness of the shell protective material is 1 to 30 nm. The overall volume fraction of the shell protective material to the core-shell structure can be less than 40%. The dimension size of the nanostructures can be less than 200 nm.

In some implementations, the material can be implemented in various ways to include one or more of the following features. The material can include a thin film coating layer on an external surface of the substrate to enhance adhesion of the nanostructures on the substrate. The thin film coating layer can include Ti, Cr, or adhesive material. The nanostructures can be configured to increase the reflectivity of light from the substrate by at least 1% as compared to the substrate without the nanostructures. The nanostructures can be configured to reduce temperature of the substrate by at least 0.2° C. as compared to the substrate without the nanostructures. The substrate can include a textile substrate or solid substrate. The textile substrate can include woven, nonwoven or knit fabrics. The textile can include a cloth including cotton, silk, synthetic polymer fiber, or composite materials fiber. The textile substrate can include an abaya textile, Ghandi hat textile, a cloth, and heat-resistant clothing.

In some implementations, the material can be implemented in various ways to include one or more of the following features. At least some of the nanoparticles can be agglomerated to one another and form a grape shaped geometry. The at least some of the nanoparticles can be separated from one another with an average spacing of at least one half the average diameter of the particle. The substrate can include at least a portion of an enclosure housing temperature sensitive components. The enclosure can include metallic, ceramic, or polymer material and can have a surface coated with a heat-insulating interfacial layer. The heat-insulating interfacial layer can include an insulator interface material having vertically aligned air pore configuration or random air pore configuration, with an addition of mechanical reinforcing shoulder array.

In some implementations, the material can be implemented to include one or more of the following features. The insulator interface material can be transparent or opaque. The heat-insulating interfacial layer can have at least 30% porosity volume and a diameter of the pore is 10 to 1,000 nm. The heat-insulating interfacial layer can include at least one of aluminum oxide, zinc oxide, calcium oxide, magnesium oxide, silicon oxide, titanium oxide, refractory metal oxide, rare earth oxide, metal nitride, or metal fluoride. The nanostructures arranged on the substrate and including the plurality of nanoparticles can form a distance-separated nanoparticle geometry. The distance-separated nanoparticle geometry can include an island geometry. The material can include a Ti based thin film coating of one of less than 10 nm or less than 2 nm disposed over a surface of the substrate to enhance the adhesion of nanoparticles on the surface. A dimension of the nanoparticles can be less than 350 nm, less than 150 nm, or less than 50 nm. The dimension of less than 150 nm is more preferred than the dimension of 350 nm and the dimension of less than 50 nm is more preferred than the dimension of less than 150 nm.

In some implementations, the material can be implemented in various ways to include one or more of the following features. For example, the nanoparticles can include metal nanoparticles with the average particle size less than shortest visible wavelength. The average particle size of the metal nanoparticles can be less than one half of the shortest visible wavelength or less than one quarter of the shortest visible wavelength. The average particle size of the metal nanoparticles being less than one quarter of the shortest visible wavelength is more preferred than one half of the shortest visible wavelength to enable optical transparency and retain a color of the substrate. The nanostructure can have a thickness to achieve a balled-up geometry of the nanoparticles and avoid a formation of flat or continuous geometry; and an average separation between the balled-up nanoparticles at least equals to one half of the average particle diameter. The average separation can enhance retaining of a base color. The thickness can be less than 100 nm, or less than 50 nm, or less than 20 nm. The thickness being less than 50 nm is more preferred than the thickness of less than 100 nm, and the thickness being less than 20 mm is more preferred than the thickness of less than 50 nm.

In another aspect, a method of forming light reflecting material includes providing a substrate; and forming nanostructures on the substrate to provide the substrate with light reflecting properties. The nanostructures include a plurality of nanoparticles and having a dimension size of substantially less than a half of a visible light wavelength. In response to heat, the substrate with the nanostructures can maintain a temperature that is lower than possible without the nanostructures.

The method can be implemented in various ways to include one or more of the following features. For example, the forming of the nanostructures on the substrate can include performing thin film deposition or spray coating typed deposition to incorporate the nanostructures to the substrate. The nanoparticles can include a balled-up geometry with the average separation between the balled-up particles at least equal to one half of the average particle diameter. The sunlight reflecting nanoparticles, either metallic or non-metallic, can be incorporated into the textile structure by mixing the nanoparticles within the polymer fiber as filler nanoparticles, or by coating on the surface of the polymer fiber before it is woven into a cloth, or by coating the nanoparticles on the woven or finished textile cloth surface. The forming of the nanostructures on the substrate can include forming the nanostructures to include a core-shell structure with a core metal material protected by a shell protective material. The forming of the nanostructures on the substrate can include forming the nanostructures to include ceramic nanoparticles, each size of the ceramic nanoparticles to be less than 350 nm. The forming of the nanostructures on the substrate can include providing optically transparent coating to maintain the color of the substrate. The method can include providing a bonding strength to the nanoparticles formed on the substrate. The providing of the bonding strength can include exposing the substrate to a surface activation solution and obtaining the coated substrate with the surface activation solution; and coating the coated substrate with a solution including ceramic nanoparticles.

The method can be implemented in various ways to include one or more of the following features. For example, the forming of the nanostructures on the substrate can include controlling the size of the nanoparticles to be optically transparent in a visible light regime to preserve the original color of the substrate. The method can further include providing a particle adhesion enhancing material having a carbon-containing silane molecule structures with lengthened chain length so as to allow the nanoparticles to easily access silane. The method can further include utilizing adhesive or epoxy containing solutions, or silane-containing solutions to strengthen bonding of the nanoparticles onto the substrate. The forming of the nanostructures on the substrate can include providing at least one grape-shaped agglomerated assembly of the nanoparticles, the at least one grape-shaped agglomerated assembly reducing toxicity effect as compared to individually separated nanoparticles. The forming of adherent nanostructures on the textile and solid substrate can include hydrolysis and poly-condensation, peptization, and then nano $Al_2O_3$ sol formation, and utilizing an activator solution comprising silane or carbon-containing silane in alcohol to activate the textile surface or solid substrate surface, followed by spray coating, dip coating or brush coating of a nanoparticle-containing solution comprising activated, sub-50 nm $Al_2O_3$ nanoparticles in alcohol, and drying and baking.

In another aspect, a method of adding a heat-insulating interfacial layer between the sunlight or IR reflecting coating and the surface of a metallic, ceramic, or polymer enclosure which is housing temperature sensitive components includes placing a premade membrane of vertically aligned air pore configuration or random air pore configuration made of oxide, nitride or fluoride on a substrate surface before the sunlight or IR reflecting coating is added.

In another aspect, a sunlight or heat wave reflection system includes a light reflecting material, including: a substrate; and a reflective coating structure disposed over the substrate. The reflective coating structure includes nanoparticles configured to increase reflectivity of near-infrared and infrared spectrum by at least 1%.

The sunlight or heat wave reflection system can be implemented in various ways to include one or more of the following features. For example, the reflective coating structure can be configured to lower a temperature of the light reflecting material by at least 0.2° C. when compared to a material without the reflective coating structure. The light reflecting material can be transparent, translucent, or opaque based at least on a thickness, a material, or both selected for the nanostructures arranged on the substrate. The system can be a part of a building, a house roof top, or a building wall to reflect sunlight or heat wave from the building, the house roof top, or the building wall, with the temperature of the building or house interior lowered by at least 0.5° C. The system can be a part of an automobile body to reflect sunlight or heat wave from the automobile body so that the automobile interior temperature is lowered by at least 0.5° C. The system can be a part of a light reflector for improved signs, markers, military vehicle roof-top identification markers. The system can be a part of shades to reflect indirect sunlight or heat wave reflection from the shades. The system is part of a fabric selected from garments, abaya, steel plant, ceramic or glass plant worker's clothing, fire fighter clothing, outdoor tent, or awnings.

The above features and their implementations and variations are described in detail in the attached drawings, the description and the claims.

BRIEF DESCRIPTION OF THE DRAWINGS

FIGS. 15(a), 15(b) and 15(c) show examples of reflecting nanoparticles having grape-shaped assembly.

FIG. 16 shows an exemplary enclosure coated with a sunlight-reflecting layer.

FIGS. 17(a) and 17(b) show exemplary configurations of a thermal insulator layer provided between the enclosure and the sunlight-reflecting layer.

DETAILED DESCRIPTION

Figure 1:
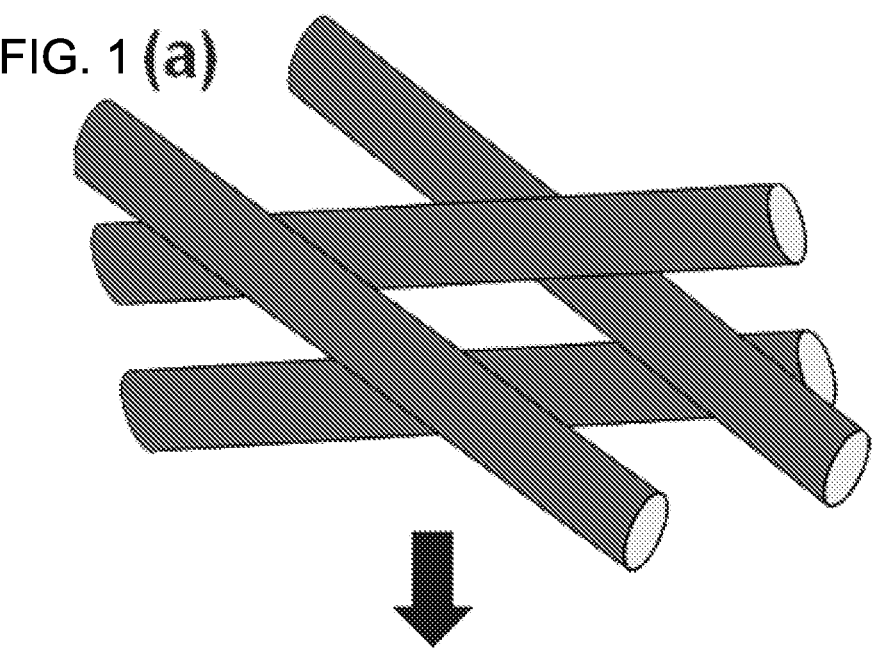
FIGS. 1(a) and 1(b) show schematic illustrations of exemplary sunlight-reflecting structures of the disclosed technology.
Figure 1:
Figure 1:
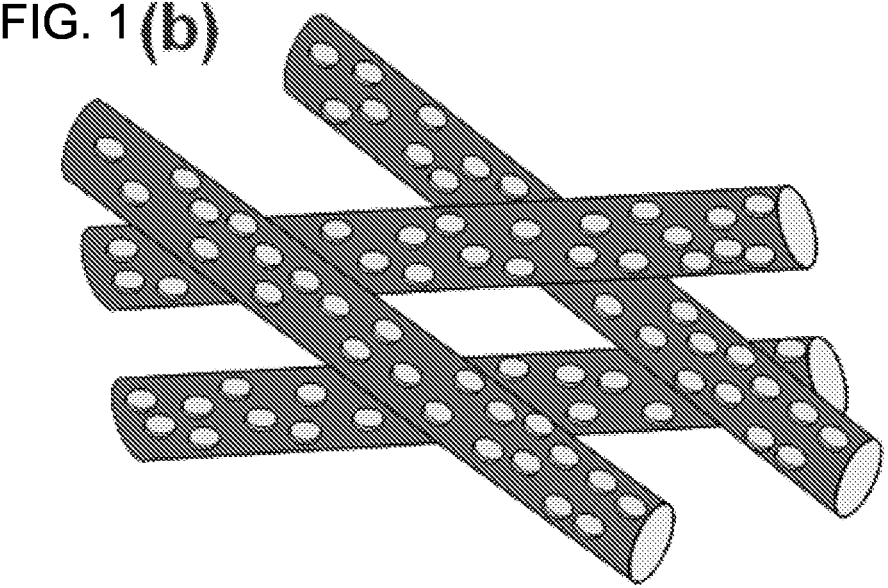

This patent document provides light reflecting structures, fabrication methods and applications that can be applicable to various applications of which temperature needs to be controlled against heat absorption. The examples of the disclosed technology provide novel and unique sunlight reflecting structures that can improve sunlight reflecting properties as compared to the case without the proposed sunlight-reflecting structures. Examples of the various application to which the disclosed technology can be applied include fabric applications, electronic applications, buildings, houses, cars, etc.

On hot summer days, clothing that people wear tend to make the people feel hotter, especially if the clothing is made of darker colored cloths such as a black color which absorbs much sunlight. A black color clothing is sometimes considered "elegant", and hence is often one of the preferred clothing colors, e.g., including by women. In many countries, the abaya (which can also referred to as burqa, burka or jilbab) is an all-enveloping cloak, a long robe-like apparel that many traditional Muslim women wear, e.g., with a primary purpose being to cover Muslim women as instructed in the Islamic custom or religion. Often being black in color, the abaya absorbs sunlight increasing the temperature and can make the wearer feel hot and uncomfortable. It is therefore desirable to enhance the sunlight reflection from dark colored cloth in general, e.g., including the black color abaya cloth, while maintaining the traditional black color. Since the black color by nature implies good sunlight absorption, this notion of sunlight-reflecting black color is contradictory. In order to overcome this contradiction, the disclosed technology in this patent document proposes a new concept of light absorption and reflection control. In some embodiments, for example, the present technology provides applications that exhibit improved sunlight reflecting properties. For example, the disclosed technology includes a design for new types of fabrics with surface modifications using nanotechnology, and introduces reflecting island array coating in nanoscale dimensions so that a desired light reflection is realized.

In addition to fabric applications such as clothing that people wear, there are electronic equipment that are exposed to sunlight, for example, outdoor surveillance camera, sensors, actuators, controllers, recorders, signal processors, robotic manipulators, RF functionality, etc., for security and other purposes. These devices are often placed in a metallic or non-metallic enclosure painted with a dark color such as black paint. On hot summer days, such enclosure painted with black can absorb significant amount of sunlight and in some cases, the temperature in the enclosure interior can reach well above 80 to 100° C. An exposure of electronic circuits and devices to such a high temperature can cause failures, for example, due to the stresses cause by thermal expansion mismatch, or due to the diffusion-induced packaging failures. Therefore, it is highly desirable to find a coating material that can be easily added on top of such enclosure, which can enhance sunlight reflection and lowers the temperature of the enclosure interior. Thus, some examples of the disclosed technology provide a design for electronic applications such as outdoor monitoring systems, security surveillance systems, etc. with surface modifications using nanotechnology, and introduce infrared-reflecting island array coating in nanoscale so that the desired light reflection is realized.

Techniques, systems, and devices are disclosed for fabricating and implementing nanostructured materials that are configured to reflect light in a light spectra range and be incorporated in a colored textiles or substrates that absorb light. In some implementations, the light spectra range includes near infrared, infrared, or red light spectra According to the disclosed technology, in order to increase the sunlight reflection, various nanomaterials including highly light-reflective metals, ceramics, or metal and ceramic composite nanoparticles can be provided on a substrate. In some implementations, the substrate to which the metal particles are deposited include textile material or non-textile material. In some implementations, light-reflecting island array coating in nanoscale dimension can be formed in order to enhance light reflection while maintaining the original color of the substrate, e.g., black color, in which the particle dimension of the nanomaterials is much smaller than the visible wavelength regime. In this case, the desired light reflection is realized while the appearance of the substrate, e.g., the color, is maintained.

FIGS. 1(a) and 1(b) show schematic illustrations of exemplary sunlight-reflecting structures of the disclosed technology. FIG. 1(a) shows an example of a traditional abaya (burka) black color cloth that includes, e.g., cotton, silk or synthetic polymer fiber, or other material. Since the abaya cloth absorbs light easily, the person wearing such clothing easily feels hot or uncomfortable. FIG. 1(b) shows light reflecting nano-islands deposited on abaya (burka) cloth fiber surface. The light-reflecting structure may be applied by various techniques including metallic or ceramic nanoparticle coating by thin film deposition or spray coating typed deposition. As one example, the sunlight-reflecting structures of FIG. 1(b) are applied to the fabric application by thin film deposition. In some implementations, the light reflecting structures may include metal nanoparticles including Ag, Au, or Pd or the combination thereof. In some implementations, the light reflecting structures may include ceramic or semiconductor material nanoparticles. In some implementations, the light reflecting structures may be configured to reflect infrared, near-infrared or red light.

The exemplary nano islands are substantially invisible to naked eyes. The size of nano-island structures can be configured to be less than a half of the visible light wavelength to be invisible. Optionally, for example, Ti thin film coating of less than 10 nm, preferably less than 2 nm can be added on the fabric or substrate surface to enhance the adhesion of nano-islands on the surface. Thin film deposition usually implies that the coated material is in the form of two dimensional continuous layer. However, in the disclosed technology, the structure is surprisingly deposited in a unique island geometry, which is important in retaining the substrate color. In some implementations, the unique island geometry can include a distance-separated nanoparticle geometry with certain shape, size, distribution, etc. In some implementations, the dimension of the nanoparticles deposited on the surface may be less than 350 nm. In some implementations, the dimension of the nanoparticles may be less than 150 nm. In some implementations, the dimension of the nanoparticles may be less than 50 nm. In some implementations, the smaller dimensions are preferred as they are easier to deposit into thinner layers which can be made optically more transparent so as to help to retain the substrate color as much as possible. In some implementations, the nanoparticles may be deposited on the surface by physical vapor deposition, for example, sputter deposition, evaporation, ion beam deposition, ion implantation or coating by chemical vapor deposition.

In some implementations, the light reflecting structures include metal nanoparticles with the average particle size less than the shortest visible wavelength. In some implementations, the average particle size of the metal nanoparticles may be less than one half of the shortest visible wavelength. In some implementations, the average particle size of the metal nanoparticles may be less than one quarter of the shortest visible wavelength. In some implementations, the smaller dimensions are preferred as they are easier to deposit into thinner layers which can be made optically more transparent so as to help to retain the substrate color as much as possible. The thickness of the deposited structure may be determined to obtain balled-up geometry nanoparticles and avoid the formation of flat or continuous geometry, with the average separation between the balled-up particles at least equal to one half of the average particle diameter. Such separation enhances to retain the base color, for example, the black color of abaya fabric. In some implementations, the thickness of the deposited structure is less than 100 nm. In some implementations, the thickness of the deposited structure is less than 50 nm. In some implementations, the thickness of the deposited structure is less than 20 nm. These can represent a well-defined structure.

Figure 3:
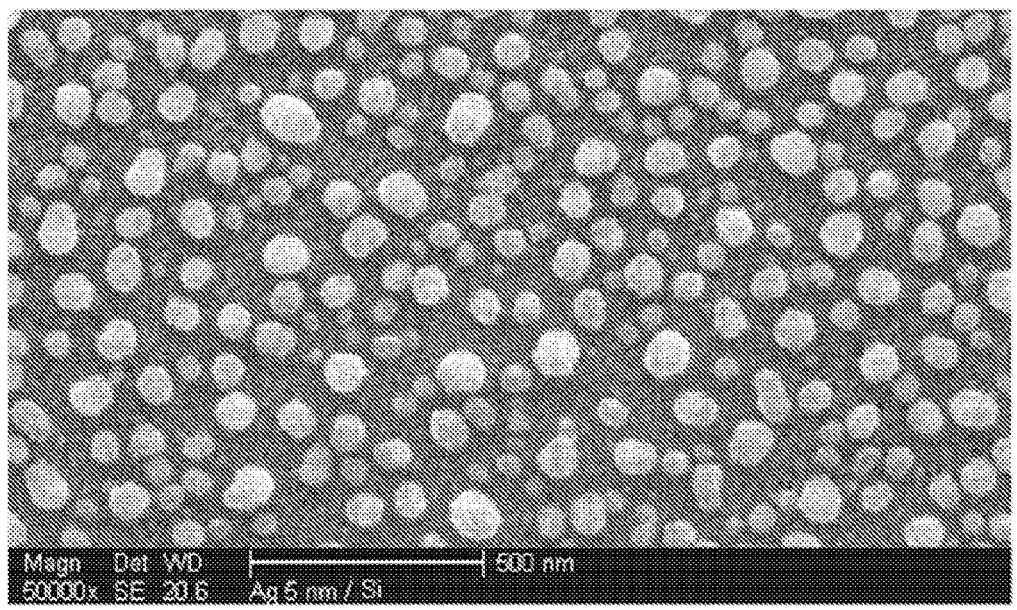
FIG. 3 shows an image showing an exemplary sub-wavelength Pd nanoparticle coating on a Si surface.

Some experiments have been performed to demonstrate the effects of the enhanced light reflection from the dark colored surface as obtained according to some implementations of the disclosed technology. The dark colored surface has been used since the dark color easily absorbs light but other color can be chosen for the surface. The exemplary implementations include coating the substrate with exemplary metal nanoparticles. In some implementations, the diameters of the metal nanoparticles may be 50 to 100 nm which is smaller than the visible light wavelength, e.g., 390 to 700 nm. FIG. 3 shows an image showing an exemplary sub-wavelength Pd nanoparticle coating on a Si surface. The metals nanoparticles having sub-wavelength dimensions minimally contribute to the visible light, thus the original black color is mostly retained.

Figure 2:
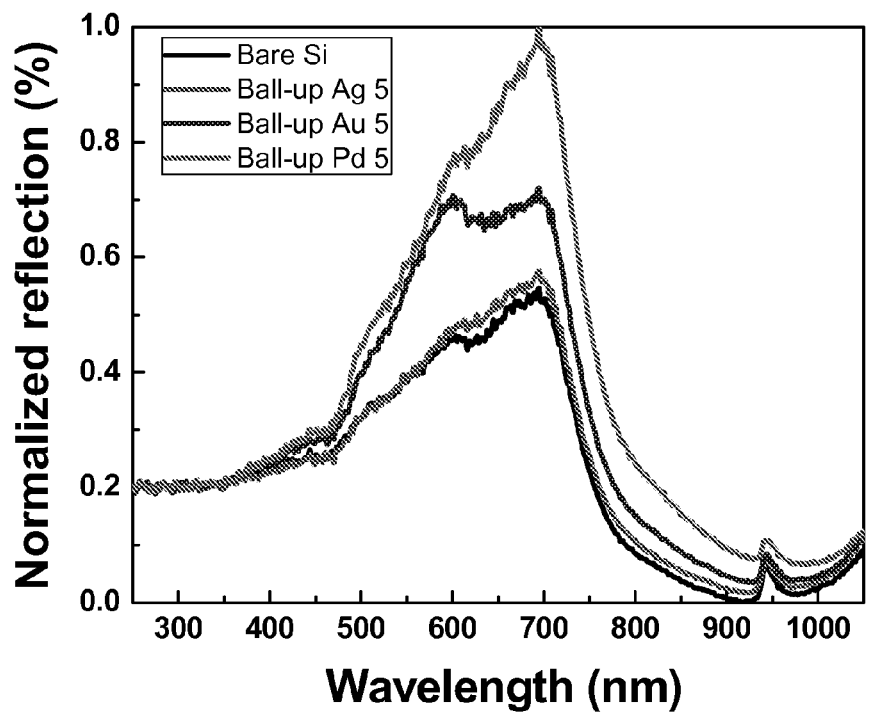
FIG. 2 shows a data plot showing the light reflection off an exemplary black Si surface after exemplary sub-wavelength metallic nanoparticles are coated on the surface.
Figure 4A:
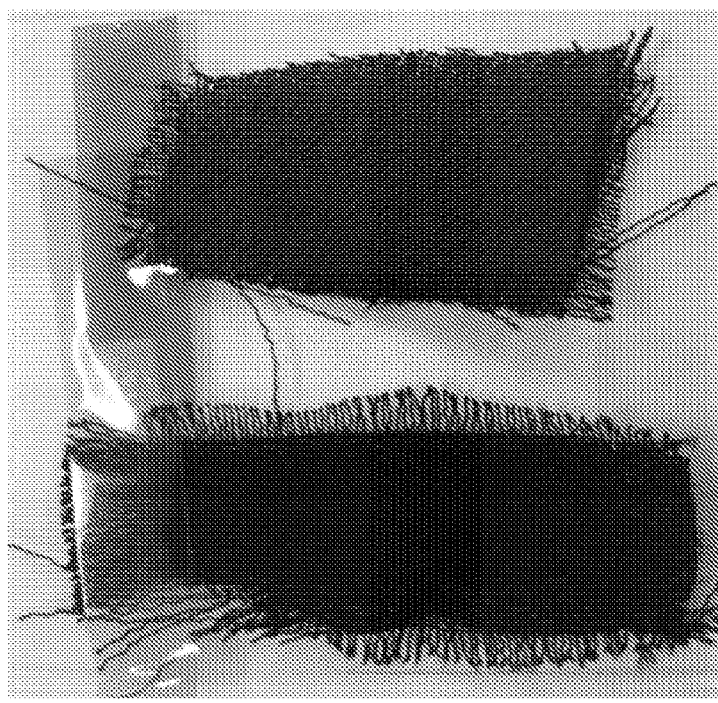
FIG. 4A shows an image of a black abaya (burka) cloth coated with exemplary metal nanoparticles for enhanced light reflection near red and near infrared light and the burka without the exemplary metal nanoparticles.
Figure 4B:
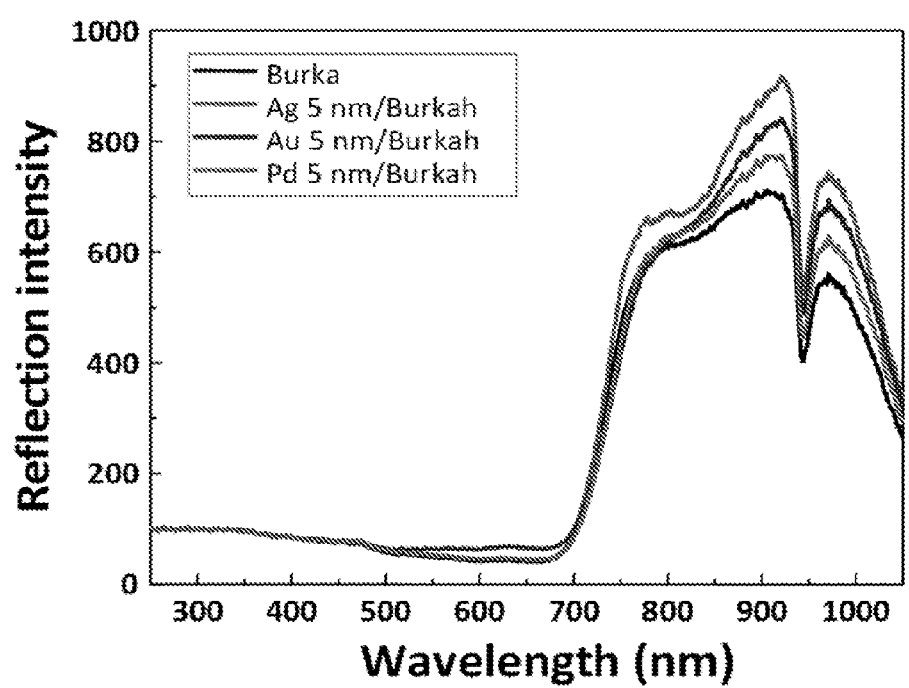
FIG. 4B shows a data plot showing exemplary reflection intensity versus optical wavelength data.
Figure 6:
FIG. 6 shows an image of example applications for implementation of the sunlight reflecting coating on abaya (the black dress) and niquab (the headscarf).

The experimental results show that the metal particles enhance the light reflection including the red to infrared color regime by reflecting substantial portion of the heat of sunlight, as demonstrated in the FIG. 2 and FIGS. 4A and 4B. FIG. 2 shows a data plot showing the light reflection off an exemplary black Si surface after exemplary sub-wavelength metallic nanoparticles are coated. As an example, the film deposition and annealing have been performed to make the metal balled up into nanoparticles. As shown in FIG. 2, the exemplary Pd nanoparticles increase the reflection almost by ~100% in visible and infrared regime colors. FIG. 4A shows an image of a black abaya (burka) cloth coated with exemplary metal nanoparticles for enhanced light reflection near red and near infrared light and the burka without the exemplary metal nanoparticles. As shown in the image of FIG. 4A, the burka sample before coating is compared to the sample after the exemplary coating, which demonstrates the retaining of basic black color. FIG. 4B shows a data plot showing exemplary reflection intensity versus optical wavelength data. Based on the experimental results, the proposed sunlight-reflection-enhanced surface can be useful for keeping the substrate cooler. FIG. 6 shows an image of exemplary applications that the proposed sunlight-reflecting structures are applied to the abaya and niquab. By implementing the sunlight reflecting coating on abaya (the black dress) and niquab (the headscarf), the abaya and niquab do not become too hot even with the heat absorption.

In some implementations, the base color of the substrate, for example, the abaya black cloth or any other colored substrate including metallic or ceramic objects, may be preferred to maintain for aesthetic or other purposes. In order to maintain the base color of the substrate, the substrate material surface may be partially exposed, instead of totally or nearly totally covered with the coated metallic nanoparticle material. In some implementations, the coated metallic nanoparticle surface coverage of the substrate may be less than 70% area fraction of the substrate surface. In some implementations, the coated metallic nanoparticles surface coverage may be less than 50%. In some implementations, in the case of transparent nanoparticles such as $Al_2O_3$ or doped ZnO particles as will be discussed below, the surface coverage by the coated nanoparticles can be higher. In some implementations, the transparent nanoparticles can even have almost 100% surface coverage due to their relatively high optical transparency. Such a structure is not excluded in the disclosed technology, although distance-separated island structure is preferred in some implementations.

In order to minimize influencing or altering the base color of the substrate, the nanoparticles on the surface may have a dimension of nano-size much smaller than the wavelength of the visible color, e.g., 390 to 700 nm. In some implementations, the dimension of the nano particles may be less than one half of the shortest visible spectrum wavelength. In some implementations, the dimension of the nano particles may be less than one quarter of the shortest visible spectrum wavelength. In some implementations, the average nanoparticle size can be less than 350 nm. In some implementations, the average nanoparticle size can be less than 150 nm. In some implementations, the average nanoparticle size can be less than 50 nm. In some implementations, the smaller dimensions are preferred as they are easier to deposit into thinner layers which can be made optically more transparent so as to help to retain the substrate color as much as possible.

Figure 5:
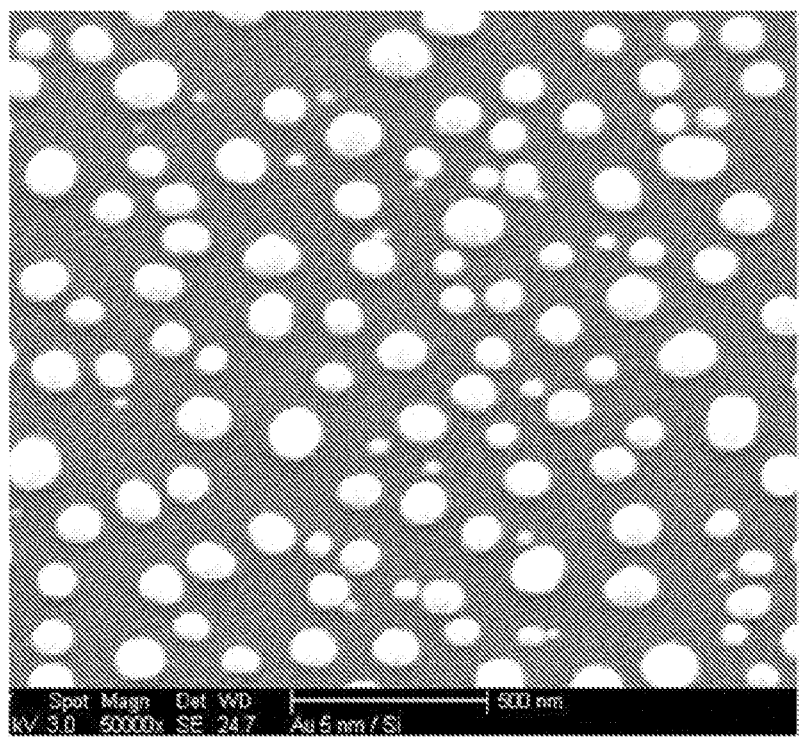
FIG. 5 shows an exemplary image of nano-scale metal particles of Ag on Abaya cloth.

In some implementations, instead of thin film metal deposition to form metal nanoparticles, thin film ceramic deposition can be employed by, for example, RF sputtering. The ceramic nanoparticle coating by thin film deposition forms ceramic or metal and ceramic composite nanoparticles utilizing the ball up approach used for the metal nanoparticle formation by film deposition as described in FIGS. 3 and 5. In some implementations, ceramic or composite nanoparticles can be provided in addition to metal nanoparticles. In some examples, metal nanoparticles can include various metals such as noble metals including Ag, Au or Pd. In some implementations, the ceramic particles can include oxide, nitride or carbide materials such as $Al_2O_3$, or semiconductor materials such as ZnO. The properly doped ceramic particles can be highly reflective of the near-IR and IR light. In some implementations, the light-reflecting particles or layers can be deposited by physical vapor deposition such as sputtering, evaporation, ion beam deposition, or ion implantation. In some implementations, the light-reflecting particles or layers can be coated by chemical vapor deposition. In some implementations, the light-reflecting particles or layers can be deposited by first preparing the nanoparticles followed by spray coating, brush coating, dip coating and other methods.

In some implementations, for the enhanced adhesion of the noble metal or ceramic layer by thin film deposition, the cloth substrate can be optionally pre-coated with a small amount of an adhesion layer such as Ti or Cr. The adhesion layer may have a thickness that can avoid excessive adhesion and reduce ball-up into nanoparticle geometry. Further, the adhesion layer may have a thickness that can avoid coverage of too much substrate surface, which will negatively affect the base substrate color. In some implementations, the thickness of the adhesion layer may be less than 10 nm. In some implementations, the thickness of the adhesion layer may be less than 5 nm. In some implementations, the thickness of the adhesion layer may be 0.1 to 10 nm. For the purpose of inducing the desired distance-separated nanoparticle structure, according to the disclosed technology, the preferred thickness of Ti or Cr adhesion layer is less than 5 nm, preferably less than 2 nm, even more preferably less than 1 nm in some implementations. If the thickness of the adhesion layer is thicker, the deposited metal or ceramic material can assume the less desirable, continuous-layer-structure, rather than isolated nanoisland structure.

In some examples, if the particles are mixed with adhesive polymers, the mixed material can be coated on cloth by spray coating, dip coating, brush coating or soak coating.

The experimental demonstrations show that the light-reflecting nanoparticles provided on a fabric material can decrease the body temperature as compared to the conventional fabric material without the light-reflecting nanoparticles. According to some experimental demonstrations, the fabric application comprising the light-reflecting nanoparticle exhibits at least 0.2° C. lower temperature near the covered skin surface than the fabric with identical materials but without the nanoparticle coating. Some experimental demonstrations show that the proposed fabric application exhibits at least 0.5° C. lower temperature near the covered skin surface than the fabric with identical materials but without the nanoparticle coating. In some cases, the proposed fabric application exhibits at least 2° C. lower temperature near the covered skin surface than the clothing with identical materials but without the nanoparticle coating.

Figure 7:
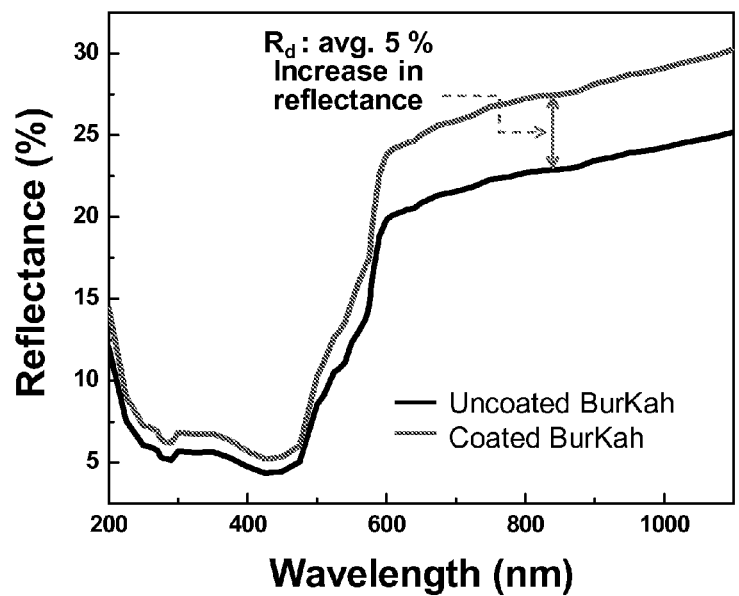
FIG. 7 shows a data plot showing the optical reflection of uncoated material and coated material.

Some implementations of the disclosed technology provide ceramic-based nanoparticle coating by thin film deposition. As an example, some implementations provide a coating technique using sub-100 nm thick aluminum oxide ($Al_2O_3$) layer on a heat-absorbing fabric, for example, black or dark colored fabric, by RF sputter deposition. As a result of such coating, the near infra-red (NIR) light reflection is substantially enhanced as shown in FIG. 7. As one example, approximately 20 nm thick thin film of $Al_2O_3$ is deposited by RF sputtering under 3 milli-torr Ar gas pressure with 200 W RF power, with the substrate rotated during deposition. Another example is to apply a sub-100 nm thick film of semiconducting zinc oxide such as aluminum-doped zinc oxide (ZnO) layer on a black (or dark or any color) cloth by RF sputter deposition. Exemplary composition is to have Al doping to partially replace Zn in the range of 0.5 to 5% wt % or preferably 1 to 3 wt %. With proper doping, ZnO conductivity is enhanced and the NIR/IR reflectivity is also improved.

It has been already discussed that thin film deposition by sputtering, evaporation, or vacuum based thin film deposition or a chemical vapor deposition is used for depositing nanoparticles of light-reflecting material including metals or ceramics or metal/ceramic composites. In some implementations, premade nanoparticles can be deposited on the substrate due to economic reasons such as for ease of processing without the use of vacuum chamber. Therefore, some examples of the disclosed technology provide coating the substrate with pre-made, light-reflecting nanoparticles using simpler and lower cost techniques such as spray coating, dip coating, or brush coating.

Metals are often more light reflective than ceramic materials, and can thus be used as surface coating material to maximize light reflection. In some implementations, due to cost concerns about precious metals such as Au, Ag, Pd, or Pt discussed earlier, non-precious metals such as Ni, Co, Ti, Al, Mo, Zr, or Ta can be utilized. Such metals are provided as examples only and other non-novel metals can be used in various implementations. In the desired nanoparticle geometry such as less than 350 nm diameter, the non-precious metal surface tends to oxidize in ambient environment or during washing operation of the cloths comprising such nanoparticles and turn to oxides having inferior sunlight reflecting properties. Therefore, some implementations of the disclosed technology provide utilizing core/shell structured nanoparticles, with the core material metallic nanoparticle with the shell protective material including ceramic material to minimize oxidation or corrosion of the metallic nanoparticles.

Figure 8:
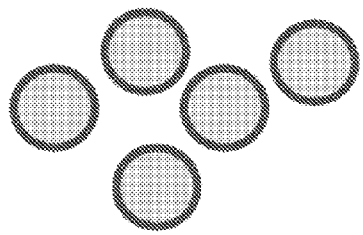
FIGS. 8(a) and 8(b) show schematic illustrations of exemplary nanoparticles having various geometry.
Figure 8:
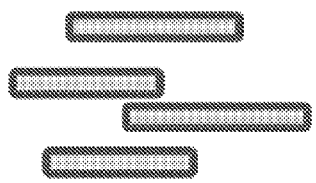

FIGS. 8(a) and 8(b) show schematic illustrations of round nanoparticles and flaky nanoparticles, respectively, both of which are utilized according to the disclosed technology. While generally near-spherical nanoparticles are more available, flaky shaped metal particles are easier to horizontally align and cover the substrate surface with minimal amount of the particles, e.g., can be aligned by smearing or shear motion, for the purpose of enhancing sunlight reflection or IR heat wave reflection. In some implementations, the dimension of the round metal nanoparticle core is less than 350 nm diameter. In some implementations, the dimension of the round metal nanoparticle core is less than 150 nm. In some implementations, the dimension of the round metal nanoparticle core is less than 50 nm. In some implementations, the flaky metal nanoparticle core has less than 5 um elongation. In some implementations, the flaky metal nanoparticle core has less than 500 nm elongation. In some implementations, the flaky metal nanoparticles core has less than 1 um width. In some implementations, the flaky metal nanoparticles core has less than 350 nm width. In some implementations, the flake metal nanoparticles core has thickness of less than 350 nm. In some implementations, the flake metal nanoparticles core has thickness of less than 100 nm. In some implementations, the flake metal nanoparticles can have a varying thickness along the length or width directions. For the purpose of optically more transparent coating to help to retain the substrate color as much as possible, the smaller dimensions of particle diameter and thickness are more preferred as they are easier to deposit into thinner layers in some implementations.

For the shell material, corrosion-resistant, oxidation resistant coating, such as $Cr_2O_3$, $Al_2O_3$, $ZrO_2$, $HfO_2$, $Ta_2O_5$, $Y_2O_3$, ZnO, MgO, or CaO can be utilized. Also, nitrides such as CrN, AlN, or ZrN or fluoride coating can also be utilized in some implementations. The thickness of the corrosion-resistant shell may be determined considering that too thick shell could negatively affect the optical properties and the resultant color and too thin coating may become less stable and ineffective against long term oxidation or corrosion, especially during exposure to water, such as on washing of clothing, on exposure to raining. In some implementations, the average thickness of the protective shell layer may be in the range of 1 to 30 nm. In some implementations, the thickness of the protective shell layer may be in the range of 2 to 10 nm. In some implementations, the thickness of the protective shell layer may be in the range of 2 to 5 nm, which is more preferred at least in some implementations. In some implementations, the overall volume fraction of the shell material as compared to the overall core-shell particle is less than 40%. In some implementations, the overall volume fraction of the shell material as compared to the overall core-shell particle is less than 20%. In some implementations, the overall volume fraction of the shell material as compared to the overall core-shell particle is less than 10%.

The core-shell particle surface protected by ceramic shells can be synthesized by various manners. In some implementations, the core-shell particle surface may be synthesized by controlled chemical reaction coating in an oxidizing chemical solutions or sol-gel solution. In this case, as examples, $Cr_2O_3$ or $Al_2O_3$ shell or $SiO_2$ may be formed. In some implementations, the core-shell particle surface may be synthesized by native oxidation (for example, natural oxidation of Ni nanoparticles to form NiO shell) or controlled atmosphere furnace oxidation or nitriding heat treatment at temperatures below 500° C. In some implementations, the core-shell particle surface may be synthesized by diffusional reaction coating like metallurgical reactions of metallic nanoparticles, for example, in a molten salt. In some implementations, the core-shell particle surface may be synthesized by physical coating such as fluidized bed evaporation or sputtering or conformal CVD deposition of the coating material. In some implementations, the core-shell particle surface may be synthesized by use of alloying approach for oxidation-resistant oxide formation.

For the alloying approach, for example, to produce surface protective $Cr_2O_3$ shell, $TiO_2$ shell, $Al_2O_3$ shell or $SiO_2$ shell on Ni nanoparticle surface, the Ni metal is intentionally pre-alloyed with Cr, Ti, Al or Si. In some implementations, the Ni metal may be alloyed with 2 to 20 wt % Cr, Ti, Al or Si. In some implementations, the Ni metal may be alloyed with 3 to 10 wt % Cr, Ti, Al or Si. In some implementations, the Ni metal may be alloyed with 3 to 6 wt % Cr, Ti, Al or Si, with this composition being the preferred composition of the alloy in some implementations. From such an alloy, nanoparticles are formed by, e.g., using spark erosion technique which creates high temperature plasma to vaporize the alloy followed by condensation into nanoparticles, for example, in a dielectric medium such as water or liquid alcane hydrocarbon or in liquid nitrogen or liquid argon to minimize oxidation. Alloy nanoparticles so produced can then be controlled atmosphere oxidized at a high temperature with optional humidity so as to allow Cr or Al or Si to diffuse out to the surface to preferentially oxidize and form the Cr-oxide or Al-oxide shell, due to their more negative heat of formation on oxidation and hence preference to get oxidized more than Ni matrix itself. In some implementations, the oxidation temperature may be in the range of 20 to 500° C. In some implementations, the oxidation temperature may be at above 200° C. Alternatively, Ni—Cr alloy can be produced by chemical synthesis such as sol-gel method prior to the controlled surface oxidation process.

In some implementations, the shell material can include polymeric material such as PDMS (Polydimethylsiloxane), PMMA (Poly(methyl methacrylate)), PS (Polystyrene), PTFE (Polytetrafluoroethylene), or epoxy material. These polymer coatings can be accomplished in various manners, for example, by such as sol-gel processing or by dip coating followed by drying under fluidized bed environment.

The surface protected, sunlight reflecting core-shell structured metal nanoparticles are then dispersed in an aqueous or solvent solution (e.g., methyl, ethyl, propyl or polyhydric alcohol) with a binder (e.g., polyvinyl alcohol) and applied by spray coating, dip coating, or brush coating and so forth, onto the surface of textile or other functional structures. In some implementations, the functional structures may include black colored metallic, plastic, carbon-based or composite box containing surveillance camera electronics or RF signaling devices. According to some implementations, adhesion enhancing agents are also incorporated for the metallic or core-shell metallic nanoparticles. In some implementations, the adhesion enhancing agents are provided by utilizing adhesive or epoxy containing solutions, or silane-containing solutions, with the latter described later for the case of ceramic nanoparticle adhesion onto the textile surface.

In some implementations, pre-made sunlight reflecting nanoparticles, either metallic or non-metallic, can be incorporated into the textile structure. In some implementations, the sunlight reflecting nanoparticles may be incorporated by mixing the sunlight-reflecting nanoparticles within the polymer fiber (as filler nanoparticles). In some implementations, the sunlight reflecting nanoparticles may be incorporated by coating on the surface of the polymer fiber before it is woven into a cloth. In some implementations, the sunlight reflecting nanoparticles may be incorporated by coating the nanoparticles on the woven or finished textile cloth surface.

Referring back to FIG. 7, substantially improved near infrared (NIR) light reflectivity is accomplished by $Al_2O_3$ ceramic thin film coating. As thin film vacuum deposition is expensive, some implementations of the disclosed technology provide a more economical processing to deposit $Al_2O_3$ ceramic material on textile surface, sol-gel based nanoparticle deposition method to impart strong adhesion of the nanoparticles to the textile fiber surface.

Figure 9:
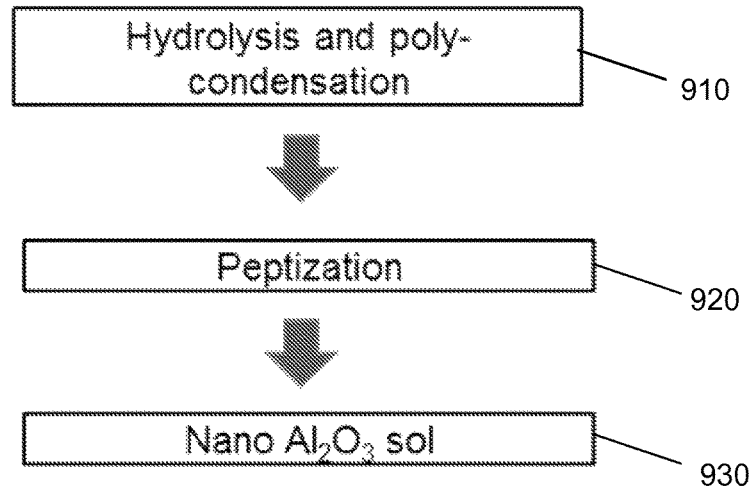
FIG. 9 shows an exemplary processing step for forming nanoparticles.

As examples of ceramic nanoparticle coating on textiles, synthesis procedures for nano $Al_2O_3$ sol and nanoparticles, as well as AZO (aluminum-doped zinc oxide) sol and nanoparticles are described as follows. FIG. 9 shows a process for synthesizing $Al_2O_3$ sol and nanoparticles. For processing, a 3-port round flask was used. Aluminum isopropoxide (AlP: assay 98%) was added to 100 ml distilled water and well mixed for a reaction for at least two hours. A mechanical stirrer was used for vigorous stirring (>700 rpm) and homogeneous mixing of the reactants. In step 910, chemical reaction that occurs is hydrolysis of water with aluminum isopropoxide to form Al—OR. Subsequently, poly-condensation process occurs with water, with organo-chemical reaction to form Al—OH and Al—O.

In step 920, the peptization process proceeds. Here a dilute hydrochloric acid (HCl: assay 35%) was added to $Al_2O_3$ reactant solution. After the peptization step, in step 930, the unstable $Al_2O_3$ solution is transformed into a colloid-like, highly dispersed solution phase comprising nano $Al_2O_3$ particles having an average particle diameter typically less than 30 nm. The chemical reaction time can be adjusted to control the particle size.

By controlling the particle size to be nano size, the coating may become essentially transparent in the visible light. In some implementations, the particle size is controlled to be less than 350 nm. In some implementations, the particle size is controlled to be less than 150 nm. In some implementations, the particle size is controlled to be less than 50 nm. In order to preserve the base color of the textile (e.g., black color of abaya) or that of black-color-painted metallic box color, or any other substrate colors such as green, yellow, red, beige or white color, the coating material needs to be essentially optically transparent in the visible light regime. With the average particle size less than 50 nm which is much smaller than the visible color wavelength spectrum, 390 to 700 nm, essentially all substrate colors underneath the coating is retained when observed by naked eye.

In some implementations, once the nanoparticles are synthesized and dispersed in a solution as described with reference to FIG. 9, an extra step is performed to ensure a strong bonding of the nanoparticles onto the textile surface so that the sunlight-reflecting nanoparticle layer is preserved after repeated washing of clothing or after exposure to rain and other environmental conditions.

Figure 10:
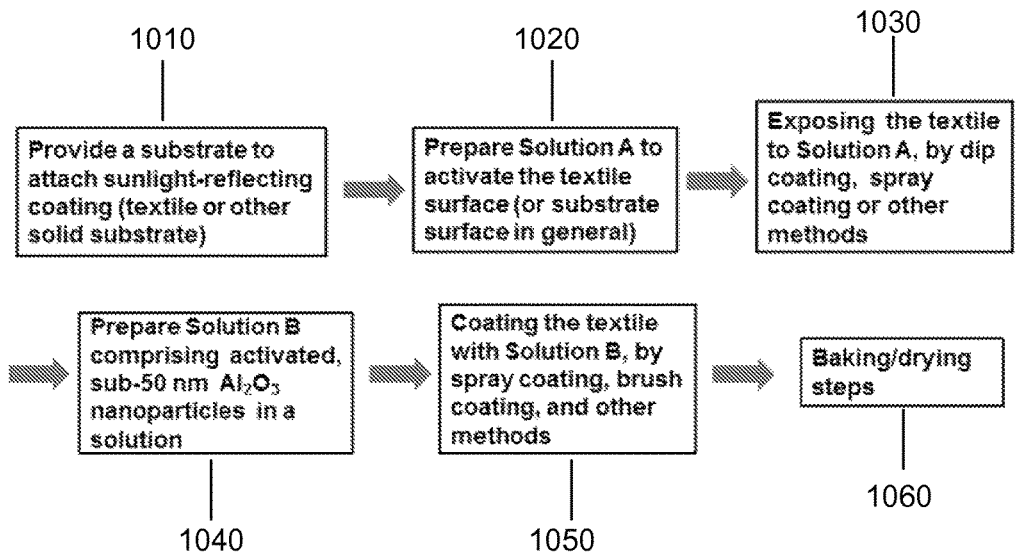
FIG. 10 shows an exemplary processing step for providing sunlight-reflecting nanoparticles onto textile or substrate surface.
Figure 11:
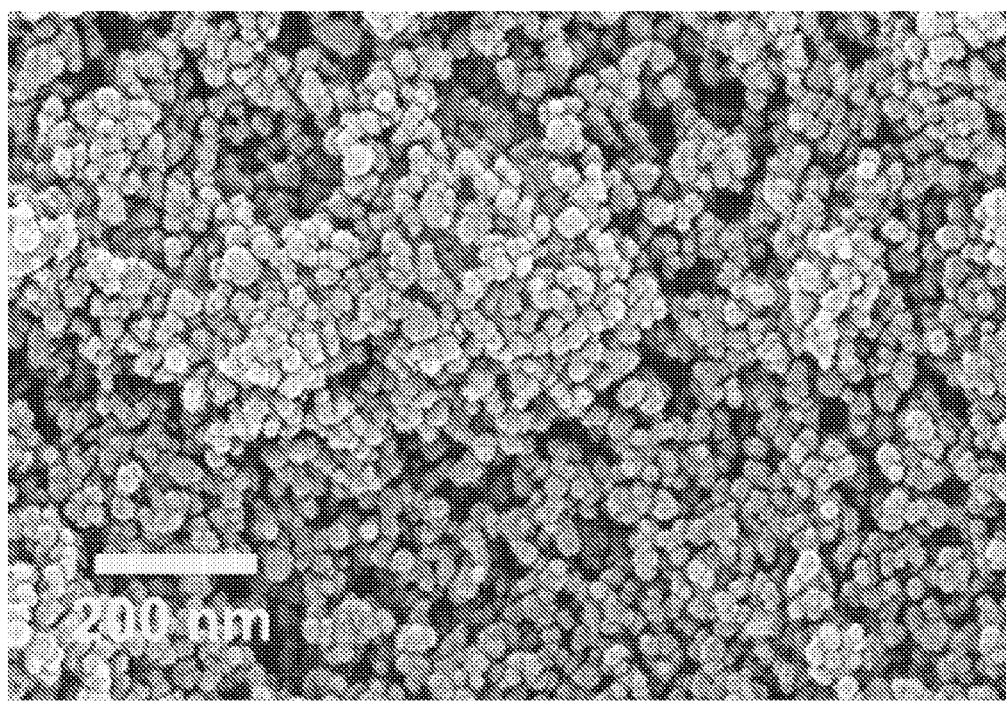
FIG. 11 illustrates a SEM micrograph image showing a nano dimension of exemplary nanoparticles.

FIG. 10 shows an exemplary process that is performed to ensure desirable strong bonding of the nanoparticles. The process consists of six steps step 1010 to step 1060. The process starts by providing, in step 1010, a substrate to which sunlight-reflecting coating is attached. The substrate may include textile or other solid substrate. In step 1020, Solution A is prepared based on alcohol type solvents with an addition of controlled silane functionality to activate the substrate surface. In step 1030, the surface is exposed to Solution A, by dip coating, spray coating or other suitable methods. In step 1040, a different solution, Solution B, comprising activated, sub-50 nm $Al_2O_3$ nanoparticles well dispersed in the Solution B is prepared. In S1050, the substrate already coated with Solution A is coated with Solution B, by spray coating, brush coating, or other suitable methods. In S1060, baking or drying is performed so that a dry substrate, for example, textile or solid substrate, is produced and ready to be used. FIG. 11 shows the SEM micrograph showing the nano dimension of the sol processed $Al_2O_3$ nanoparticles with an average diameter of ~30 nm. As mentioned above, in some implementations, the dimension of the nanoparticles is less than 350 nm. In some implementations, the dimension of the nanoparticles is less than 150 nm. In some implementations, the dimension of the nanoparticles is less than 50 nm.

While organic dyes have been available in the art for sunlight reflection purpose, inorganic materials like $Al_2O_3$ nanoparticles are utilized in this patent document. It is known that some of the organic dyes are toxic in that they can be intercalated between DNA bases in human or animal body and cause cancers. Using ceramic NP for controlling IR reflection on textile is not harmful for our health and environment.

In some implementations, a surface activating solution, Solution A, applied to the substrate surface (textile or any solid substrate) contains 1,2-bis(triethoxyslilyl)ethane or 1,6-bis trichlorosilyl hexane. These two materials have silane structure (Si(OEt)3) on both ends of the molecules and can easily react with ceramics or polymer to form a strong covalent bonding. After treatment of the textile with the Solution A, some of silane parts will react with polymers that contain amide or hydroxyl components, and the other parts will remain as silane or as $Si(OH)_3$. The ceramic nanoparticles from the Solution B will attach on these $Si(OH)_3$ or silane functionality.

In conventional technologies, $Si(Cl)_4$ has been used as particle adhesion enhancing material, for example, silica nanoparticles. However, $Si(Cl)_4$ molecule is so small that the access of nanoparticle to non-smooth, real life, rough surface of textile or ceramic particles becomes difficult. For practical purposes, it is therefore necessary to produce and use longer chain molecules so that the bonding bridges have some length room to be attached onto rough surfaces. For this purpose, some implementations of the disclosed technology utilizes a carbon-containing silane molecule structures with their chain length intentionally made longer so as to allow ceramic nanoparticles to easily access silane. In some implementations, the desirable number of carbon atoms in the structure of silane compound is in the range of 1 to 20. In some implementations, the desirable number of carbon atoms in the structure of silane compound is 2 to 6. For example, 1,2-bis(triethoxyslilyl)ethane, and 1,6-bis trichlorosilyl hexane which has 2 and 6 carbon atoms each can be desirable silane structure. These chemicals are easily available and relatively inexpensive.

To ensure strong bonding of nanoparticles onto textile fiber surface or substrate surface, it is helpful to utilize silane functionality on the nanoparticles. If too large amount of silane is used on nanoparticles, they may get agglomerated. On the other hand, if too little silane is used, the bonding enhancement may not be efficient. Therefore, there is an optimal amount of silane to be used on nanoparticles. In some implementations, the thickness of the silane to be attached onto the nanoparticle surface is less than 10 monolayer. In some implementations, the thickness of the silane to be attached onto the nanoparticle surface is less than 5 monolayer.

Solution B is prepared by mixing ceramic nanoparticles and base solvents such as ethanol or isopropyl alcohol and additionally mixing a small amount (e.g., 0.05 to 0.2 wt %) of functional polymers such as tris(trimethylsilyl)amine or tetramethyldisilazane to make the nanoparticle surface hydrophobic. These polymers help to minimize nanoparticle agglomeration by themselves, and also helps to make the coated nanostructured surface superhydrophobic so that the ceramic nanoparticles adhere and bond well onto the end of controlled silane functionality which is already attached to the textile or solid surface by Solution A. For the ease of spray coating of Solution B onto the textile or other substrate surface, the nanoparticles can be immersed in a solvent such as alcohol. A small amount (e.g., 0.05 to 0.2 wt %) of functional polymers such as tris(trimethylsilyl)amine or tetramethyldisilazane can be added. These polymers help to minimize nanoparticle agglomeration by themselves, and also helps to make the coated surface superhydrophobic.

Figure 12:
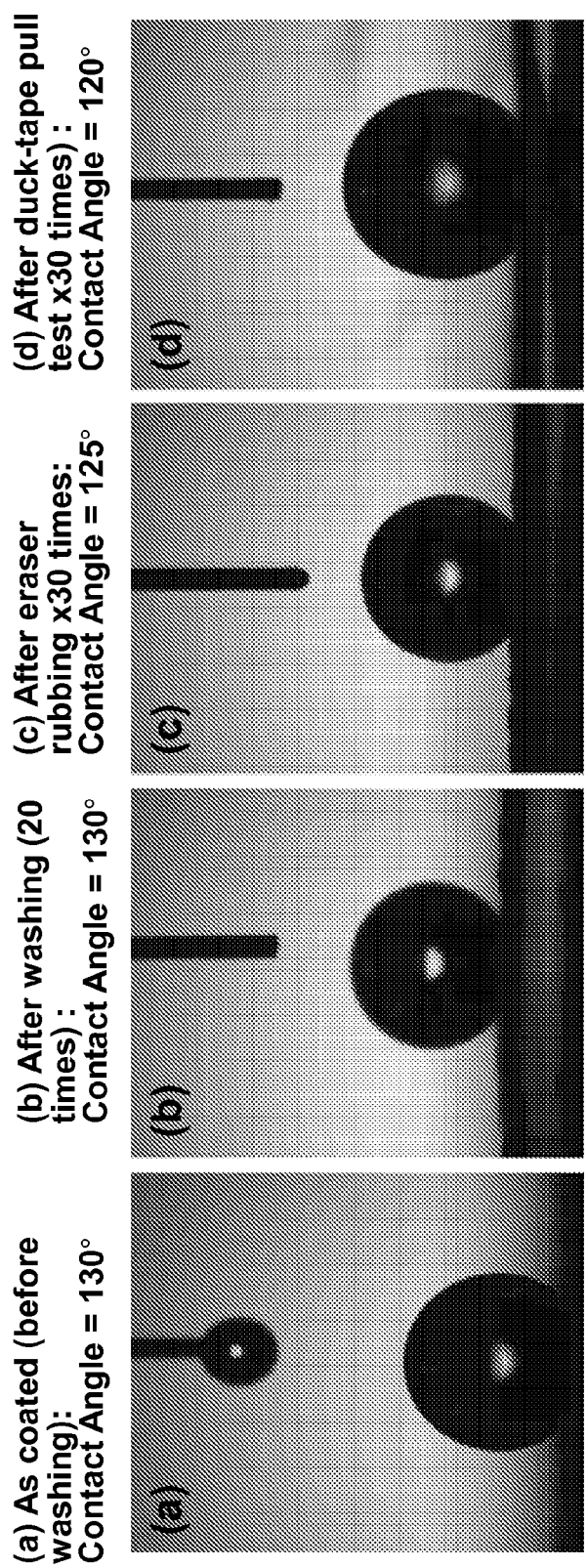
FIGS. 12(a), (b), (c), and (d) show an exemplary durability test for testing an adherence of exemplary nanoparticles on textile surface.

FIGS. 12(a), (b), (c), and (d) illustrate the superhydrophobic property of the sunlight-reflecting coating disclosed in this patent document. In some implementations, the sunlight-reflecting layer can exhibit superhydrophobic characteristics due to the incorporation of nanoparticles, exhibiting water droplet contact angle of at least 100 degrees. In some implementations, the sunlight-reflecting layer can exhibit superhydrophobic characteristics with water droplet contact angle of at least 120 degrees. In some implementations, the sunlight-reflecting layer can exhibit oil-repelling superhyoleophobic characteristics due to the presence of nanoparticles, exhibiting oil droplet contact angle of at least 100 degrees. In some implementations, the sunlight-reflecting layer can exhibit superoleophobic characteristics with oil droplet contact angle of at least 120 degrees. Such superhydrophobic or superoleophobic properties help the textile to behave water-repellent or oil-repellent so that the cloth does not get dirty easily. By virtue of the strong adhesion of the nanoparticles onto the textile or solid substrate surface, the sunlight or IR reflecting coating according to the invention exhibits desirable durability on repeated washing or mechanical contacts. FIG. 12(a) shows the as coated cloth surface before washing exhibiting a superhydrophobic water droplet contact angle of 130°, FIG. 12(b) still exhibiting, after repeated washing 20 time in a laundry machine, a superhydrophobic water droplet contact angle of 130°, FIG. 12(c) exhibiting, after repeated eraser rubbing 30 times, a superhydrophobic water droplet contact angle of 125°, and FIG. 12(d) exhibiting, after repeated duck-tape pull test 30 times, a superhydrophobic water droplet contact angle of 120°. Thus the textile with sunlight or IR reflecting coating, according to the invention, exhibits a highly desirable durability of the nanoparticles adherence with at most 20% loss, preferably at most 10% loss, even more preferably at most 5% loss of the adhered nanoparticles after repeated washing of 20 times in a laundry machine or repeated rubbing. Such adherence of the nanoparticles are indirectly manifested in the contact angle measurement shown in FIG. 12(a) through (d), with the loss of superhydrophobic contact angle of at most 20 degrees, preferably at most 10 degrees.

The textile material onto which the nanoparticles will be attached include a wide variety of fiber materials including cellulose acetate, cellulose, nylon, acrylic, PET (polyethylene terephthalate), polyurethane, PP (Polypropylene), polyethylene (PE), PVDF (polyvinylidene difluoride), polyamide, polyacrylonitrile, polylactide, cotton, silk, or protein (fibroin, keratin). The textile can be woven, non-woven, or knitted fabric.

Figure 13:
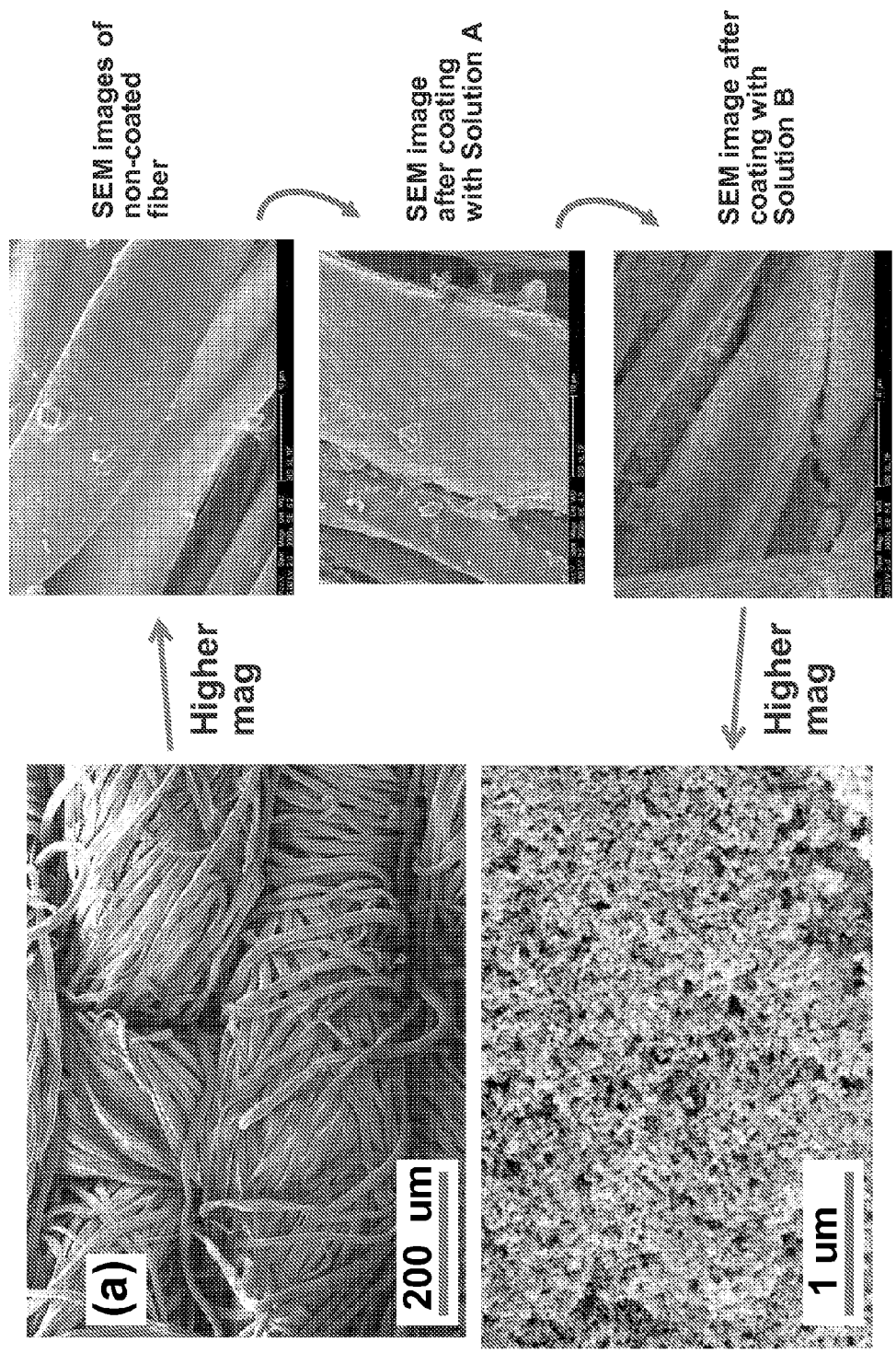
FIG. 13 shows SEM images of exemplary coated nanoparticles.

FIG. 13 illustrates SEM images of cellulose acetate textile fiber coated with ~100 nm thick, sub-50 nm size $Al_2O_3$ nanoparticles at various stages of processing. The various stages shown in FIG. 13 include before coating, after coating with Solution A, and after coating with Solution B. Higher magnification SEM micrographs show the comparison between the absence and the presence of sunlight-reflecting $Al_2O_3$ nanoparticles. The presence of at least 20 nm thick, sunlight-reflecting $Al_2O_3$ nanoparticles on the surface of textiles or any solid surface, produces adherent, and superhydrophobic coating, having a sunlight-reflecting properties of near-infrared (NIR) and infrared (IR) light reflectivity. In some implementations, the sunlight-reflecting properties may be improved by at least 1%. In some implementations, the sunlight-reflecting properties may be improved by at least 5%. In some implementations, the sunlight-reflecting properties may be improved by 10%. In some implementations, the superhydrophobic contact angle is improved to be at least 10 degrees. In some implementations, the superhydrophobic contact angle is improved to be at least 130 degrees.

In addition to the $Al_2O_3$ nanoparticles, other types of ceramic nanoparticles can also be utilized to enhance the sunlight-reflecting properties. Some examples of other ceramic materials include $SiO_2$, $TiO_2$, ZnO, MgO, $Cr_2O_3$ or refractory metal oxide including Zr, Hf, or Ta, etc. In some implementations, ceramic materials may include mixtures or variations of each of the above exemplary ceramic materials through doping with other elements by less than 30 atomic %, less than 10 atomic %, or less than 3 atomic %. According to some implementations, when processed to have a nanoparticle geometry and made to a well adherent coating, aluminum-doped ZnO can exhibit desirable sunlight-reflecting properties of at least 1%, at least 5%, or at least by 10% improvement in NIR and IR reflectivity, combined with durability on repeated washing or rubbing, and superhydrophobic properties.

Similarly, surface protected core-shell metal nanoparticles such as Ni coated with at least 1 nm thick NiO or $Cr_2O_3$ or $Al_2O_3$, or other protective coating, when processed to have a nanoparticle geometry and made to a well adherent coating, can exhibit desirable sunlight-reflecting properties of at least 1%, at least 5%, or at least by 10% improvement in NIR and IR reflectivity, combined with durability on repeated washing or rubbing, and superhydrophobic properties.

Figure 14:
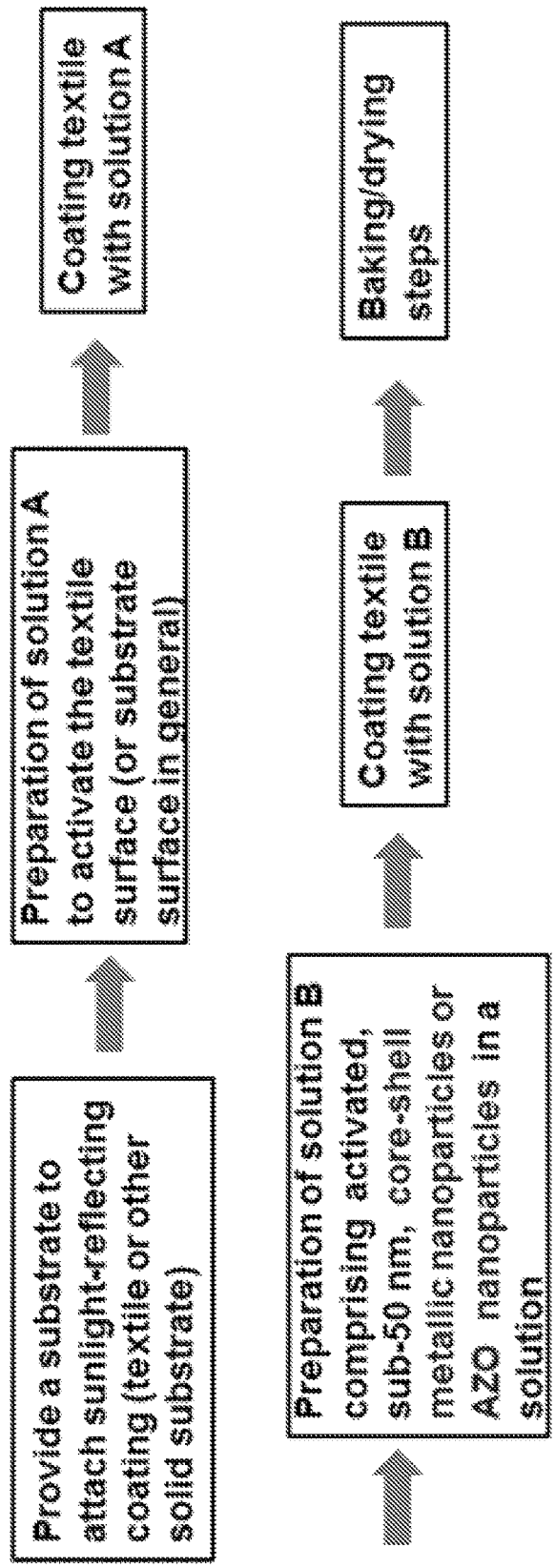
FIG. 14 illustrates an exemplary processing step for producing sunlight-reflecting nanoparticles onto textile or substrate surface.

FIG. 14 show a processing step for producing strongly adhered, sunlight-reflecting coating layers of core-shell metal nanoparticles or Al-doped ZnO nanoparticles (NPs) onto textile or solid substrate surface. Solution A represents adhesion enhancing functionality addition onto the textile or other substrates. Solution B contains sunlight-reflecting nanoparticles of core-shell metallic structure or AZO nanoparticles, together with dispersion enhancing components.

FIGS. 15(a), 15(b) and 15(c) show implementations utilizing grape-shaped assembly of sunlight reflecting nanoparticles including $Al_2O_3$, Al-doped ZnO (AZO) or core-shell metal nanoparticles that have a reduced toxicity effect. The schematic illustrated in FIG. 15(a) shows randomly distributed, non-agglomerated nanoparticles and FIG. 15(b) illustrates an intentionally agglomerated, grape-shape geometry of nanoparticle assembly including AZO nanoparticles.

FIG. 15(c) represents a scanning electron microscopy (SEM) image showing the grape-shape nanoparticle geometry of AZO. As the nanoparticles in the grape-assembly include ~30 nm nanoparticles, the sunlight-reflecting optical properties as well as superhydrophobic properties are not affected substantially. While both individual nanoparticle coating of FIG. 15(a) and the assembled nanoparticle coating of FIG. 15(b) are made to be highly adherent by utilizing techniques described above, there may still be some small possibility that some of the nanoparticles may come off the textile surface on repeated/extended washing or rubbing.

The adverse nanotoxicity effect of extremely small nanoparticles on human health is well documented in recent years. Therefore, the use of such grape-shape assembled nanoparticles made larger in overall dimension but still maintaining nanoparticle geometry and associated physical property benefits can be useful in reducing the nanotoxicity as compared to individualized ~10-50 nm sized nanoparticles. This can be an important aspect to consider, especially when applied to textiles that human subjects will wear and breathe nearby, which may induce detrimental health effect due to nanotoxicity. The nanotoxicity can be measured, for example, by counting the number of living cells vs that of dead cells during in vitro cell culture experiments. The use of grape-shaped nanoparticles may reduce the number of dead cells by at least a factor of two.

AZO, $Al_2O_3$ or core-shell metal nanoparticles can intentionally be made into a grape-assembly configuration of FIG. 15(b) by using a basic solution such as sodium hydroxide or ammonium hydroxide during synthesis or handling of nanoparticles. On the other hand, if an acid based solution such as acetic acid, nitric acid, sulfuric acid, citric acid, or phosphoric acid is utilized, then more dispersed, non-grape shape nanoparticles of FIG. 15(a) are formed.

The benefit of some implementations of sunlight-reflecting coating utilizing grape-assembly configuration of nanoparticles can be maximized if the grape assembly dimension is at least 80 nm size in average diameter, at least 150 nm diameter, or at least 300 nm in diameter. As the individual nanoparticle component comprising the assembled particles is already ~30 nm or smaller, the optical properties are minimally affected by the particle assembly into the grape geometry. In some implementations, the thickness of the coating in this case of utilizing grape-configuration nanoparticles is at least 100 nm. In some implementations, the thickness of the coating in this case of utilizing grape-configuration nanoparticles is at least 500 nm.

Implementations of the disclosed technology are applicable to various applications such as fabric applications, electronic applications, and others. The disclosed sunlight-reflecting coating can be used for the purpose of maintaining the original surface color but simply adding or enhancing the sunlight-reflecting characteristics. In some implementations, the coating material is essentially transparent, either by separated and non-100% area coverage nanoparticle distribution configuration, or by the imparted ceramic layer's transparent property itself, or combination of both.

In some implementations, optically transparent sunlight-reflecting coating may be provided to maintain the original material colors and simply add the sunlight-reflecting properties to practical applications. For example, for a fabric application, the color is one of factors that can influence people's attraction to the fabric application. Thus, maintaining the original color of the fabric application with the sunlight-reflecting characteristics can maintain people's preference for the fabric applications. For example, for aesthetic or other various purposes, people wearing black colored fabric including abaya, dresses or garments may want their fabric to be remained in black. For example, for decorative or other various purposes, people wearing the white colored fabric including white Gandhi cap may want the white color to be kept. An optically transparent yet reflective for the NIR and IR light would thus be desirable for the purpose of maintaining the white color while increasing the sunlight reflection. In some implementations, for an electrical application such as outdoor surveillance security camera, the original black color may need to be maintained due to security or other various reasons. The implementations of the disclosed technology provide an optically transparent coating which maintains the color of the material or substrate underneath but enhancing the sunlight-reflectivity or other IR light reflectivity.

In some implementations, optically non-transparent sunlight-reflecting coating (such as black, grey or red coating) may be provided for some applications where the exact substrate color of textile or metal surface may not have to be retained. For example, when the substrate color of the textile or metal surface itself has an identical or similar color already, optically non-transparent sunlight-reflecting coating can be employed.

For optically enhanced functions and appearances, in some implementations, other composite or mixed structures such as involving quantum dots, phosphors or other luminescent nanoparticles or layers may also be added or mixed with the sunlight-reflecting nanoparticle coating. As discussed, the disclosed technology can also be applied to non-cloth applications, wherever enhanced sunlight reflection is desired, for example, outdoor tents, awnings, as a light reflector for improved signs, markers, military vehicle roof-top identification markers, black color painted outdoor electronic boxes such as security/surveillance cameras, and other RF or Wi-Fi signaling applications.

Black or dark surface colored structure (e.g., a metallic, ceramic, polymer or composite material box or enclosure), for example, an enclosure type structure, is often utilized to safely keep electronic device components inside, such as for outdoor surveillance cameras, sensors, actuators, controllers, recorders, signal processors, robotic manipulators, RF functionality, etc.).

In addition to the outdoor clothing that people wear, there are also electronic equipment that are exposed to sunlight, for example, outdoor surveillance camera for security purposes. These devices such as for outdoor surveillance cameras, sensors, actuators, controllers, recorders, signal processors, robotic manipulators, or RF functionality, etc. are often placed in a metallic box painted with a dark color such as black paint. On hot summer days or geographically warm regions on earth, such black boxes can absorb significant amount of sunlight and the temperature in the box interior can reach well above 80 to 100° C. in some cases. An exposure of electronic circuits or devices to such a high temperature can cause failures of operations of the electronic circuits or devices, for example, due to the stresses cause by thermal expansion mismatch, or due to the diffusion-induced packaging failures. Therefore, it is highly desirable to find a coating material that can be easily added on top of such black or dark colored metal boxes, which can enhance sunlight reflection and lowers the temperature of the box interior. In some implementations, in order to maintain the original dark color for aesthetic purposes, the sunlight-reflecting coating may be transparent or nearly transparent. In some implementations, non-transparent or colored sunlight-reflecting coating (e.g., blue, yellow, red, etc.) may be provided.

FIG. 16 provides an exemplary enclosure of an electronic equipment, which is coated with a sunlight-reflecting layer. Although FIG. 16 has been illustrated that the enclosure 1610 has a box shape, other implementations are also possible. The enclosure 1610 includes temperature-sensitive electronic devices that need to be protected against higher temperature exposure caused by sunlight heating of the black metal box. In FIG. 16, the enclosure 1610 is coated with the sunlight-reflecting layer 1630 to enhance sunlight reflecting and lower the temperature of the enclosure interior. In some implementations, the temperature-sensitive electronic components that are place inside of the enclosure 1610 include outdoor surveillance cameras, sensors, actuators, controllers, recorders, signal processors, robotic manipulators, or RF functionality, etc. In some implementations, the enclosure 1610 may have black or dark color by paining or anodization, or natural black or dark color. In some implementations, the enclosure 1610 may include metallic, ceramic, or polymer or composite material.

According to some implementations of the disclosed technology, a thermal insulator layer 1620 may be additionally provided at the interface between the enclosure and the coated sunlight-reflecting layer 1630 so as to minimize conduction-based heat transfer from the surface to the metal substrate. Such a thermal insulator layer 1620 can be added on the enclosure surface first, then the sunlight-reflecting layer 1630 added subsequently. In some implementations, the thermal insulator layer 1620 can have a vertically aligned air pore configuration. In some implementations, the thermal insulator layer 1620 can have a random air pore configuration. FIG. 17(a) shows the thermal insulator layer having vertically aligned air pores. In some implementations, the vertically aligned air pores may have at least 30% volume of the thermal insulator layer 1620. In some implementations, the vertically aligned air pores may have at least 50% volume of the thermal insulator layer 1620. In some implementations, the vertically aligned air pores may have at least 75% volume of the thermal insulator layer 1620. In some implementations, the thermal insulator layer 1620 with the vertically aligned air pores may be optically transparent. In some implementations, the thermal insulator layer 1620 with the vertically aligned air pores can be provided by anodizing, for example, anodized aluminum oxide (AAO) membrane. In some implementations, the AAO membrane has 0.2 to 500 um thickness. In some implementations, the AAO membrane has 1 to 100 um thickness. Use of premade AAO membrane or $SiO_2$ membrane that can be floated on water or solvent and picked up by the substrate from underneath can be also possible and provides a novel, convenient and economical way of adding such heat-insulating layer on the enclosure surface. In some implementations, additional adhesion-enhancing layer such as epoxy may be provided.

Figure 18:
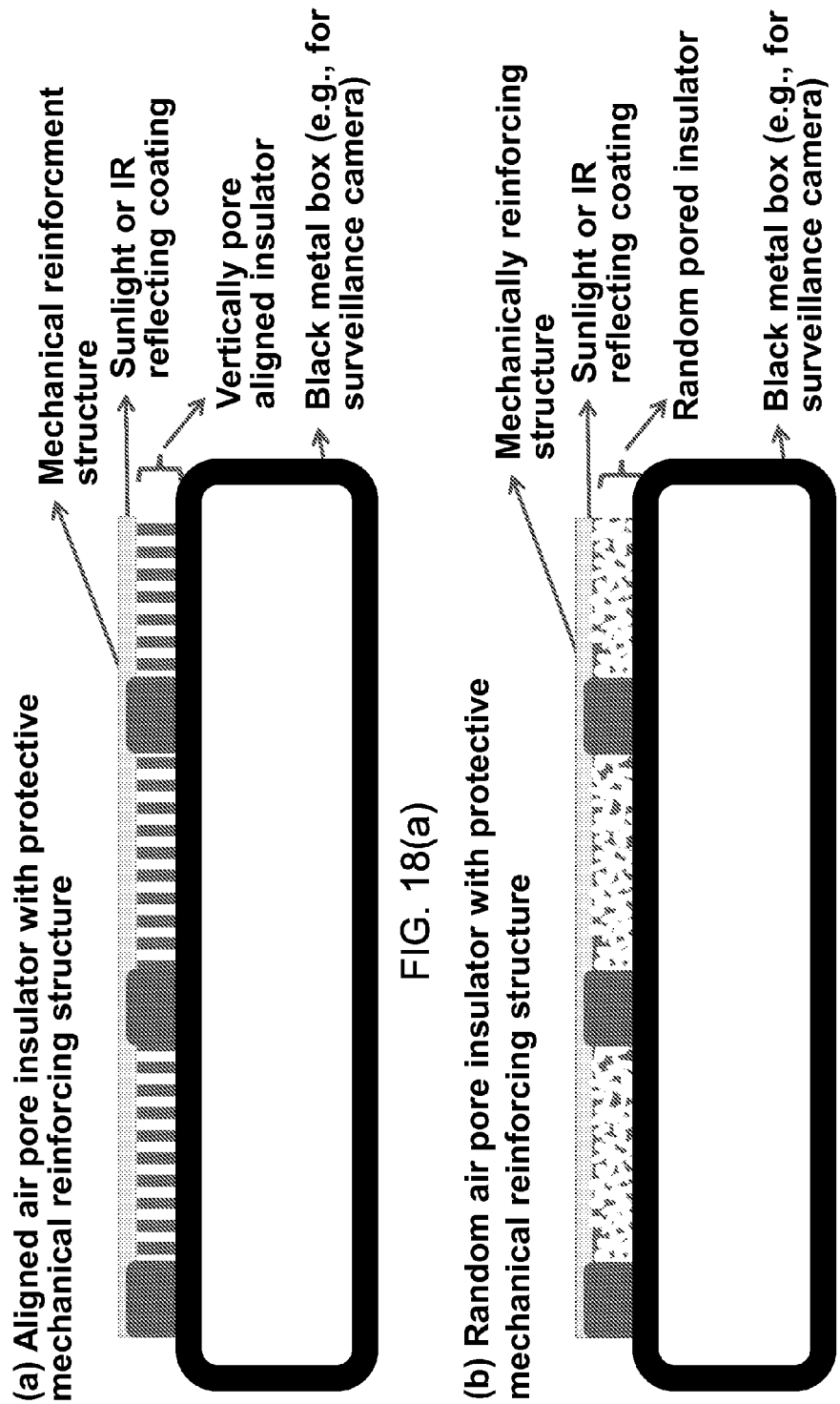
FIGS. 18(a) and 18(b) show mechanical reinforcing structure for the high-porosity thermal insulator layer between the black box and the sunlight-reflecting coating, with the insulator having either (a) vertically aligned air pore configuration or (b) random air pore configuration.

FIG. 17(b) shows the thermal insulator layer having randomly distributed air pores. In some implementations, the randomly distributed air pores may have at least 30% volume of the thermal insulator layer 1620. In some implementations, the randomly distributed air pores may have at least 50% volume of the thermal insulator layer 1620. In some implementations, the randomly distributed air pores may have at least 75% volume of the thermal insulator layer 1620. In some implementations, the thermal insulator layer 1620 with randomly distributed air pores may be optically transparent. In some implementations, the thermal insulator layer 1620 with the randomly aligned air pores can be provided by loose powder sintering process of oxide nanoparticle or microparticle material, sacrificial material removal process, or aerogel method or sol-gel process. In some implementations, the pores can be isolated or connected. Some of these pored thermal insulators may be mechanically not so strong. In order to enhance the durability of the coating, the disclosed technology also utilizes mechanical reinforcement structure as illustrated in FIGS. 18(a), (b), (c), and (d). The reinforcing structure tends to protect the porous layer when there is a vertical force. Mechanical reinforcing structure is added into the high-porosity thermal insulator layer between the black box and the sunlight-reflecting coating. The insulator can have either a vertically aligned air pore configuration (FIG. 18(a)) or a random air pore configuration (FIG. 18(b)). The mechanical reinforcing structure can be made of metal, ceramic, polymer or composite. It can be periodic or non periodic. The patterning can be produced by stamping, lithography, chemical etching or as a left-over blocked structure during anodization etch process.

In order to maintain the base color (e.g., black metal surface color underneath), the thermal insulator layer 1620 may have optical transparency with at least 80% transmission in the visible spectrum. In some implementations, the insulator may have a matching color as the substrate color (e.g., black painted metal surface in combination with black $TiO_2$ membrane layer or black $SiO_2$ membrane layer). Oxide based insulators generally exhibit white color or transparent color. If the interface membrane comprises nanostructured oxide, a dark color can be produced in the essentially insulating (or semiconducting) oxide layer. Anodization of aluminum surface can create a variety of desired colors depending on the nano dimension of nano-pores, partly depending on optical light scattering by different geometry structures. According to some implementations of the disclosed technology, the interface thermal insulator may include oxide membrane material having at least 30% porosity volume, at least 50%, porosity volume, or at least 75% porosity volume, in combination with a nano dimension structure of e.g., 10 to 1,000 nm (e.g., diameter of pores) or 20 to 200 nm. In some implementations, the thermal insulator may contain at least one material or a combination of materials selected from aluminum oxide, zinc oxide, calcium oxide, magnesium oxide, silicon oxide, titanium oxide, refractory metal oxide, rare earth oxide, metal nitride, metal fluoride or other various combination of oxide, nitride, or fluoride.

In some implementations, the disclosed sunlight reflecting coating on textiles or metallic surfaces not only reflects visible and near infrared (NIR) light, but also reflect longer wavelength infrared light. For example, in a city with warmed up buildings and asphalt roads, even if sunlight is blocked by clouds or building shadows, the heat wave (mid infrared light, e.g., in the range of 2 um to 50 um, more specifically in the range of 2 um to 10 um wavelength light) is present and can still make a person wearing dark colored or even light colored clothing feel hot and uncomfortable. Aside from the streets or roads environment, various work environment where a worker has to deal with hot objects such as blacksmith hot metal parts, glass-blowing shops, or hot steel ingots, casting, and hot rolled metal plates in factory environments, as well as fire fighters in action can make a person feel hot and uncomfortable. Various implementations of the disclosed technology also enable such heart-wave IR to be reflected away from the textile or substrate surface. Thus, the IR reflecting coating of the disclosed technology can be useful for lowering the temperature of various targets including (a) person or animal, (b) enclosure containing heat-sensitive electronic components/devices, and (c) building or housing structure or wall surface.

In some implementations, the cloth can be coated with a continuous or semi-continuous layer of sunlight-reflecting metal, alloy, ceramic, or semiconductor material. Yet in another implementations, the sunlight-reflecting nanoparticles can be incorporated within the polymer fiber (e.g., as filler nanoparticles) or coat on the surface of the polymer fiber before it is woven into a cloth.

For example, the disclosed technology is applicable to garments, abaya, outdoor tent, awnings, or special cloth applications for the purpose utilizing metallic color or for other decorative purpose. In some examples, core-shell nanoparticles can also be utilized, as the thin shell (e.g., less than 20 nm) can be optically transparent or non-interfering while providing long-tern durability and corrosion resistance, mechanical durability, and optical property enhancement.

Other composite or mixed structures, e.g., such as involving quantum dots, phosphors or other luminescent nanoparticles/layers, may also be added for optically enhanced functions and appearances.

The disclosed technology can also be applied to non-cloth applications, wherever enhanced sunlight reflection is desired, for example, outdoor tents, awnings, as a light reflector for improved signs, markers, military vehicle rooftop identification markers (for example, to allow easy identification of enemy military trucks vs friendly military trucks by special agents or military fighter airplanes), and other signaling applications.

Yet in another embodiment, superhydrophobic, superhydrophilic or super-omniphobic properties (e.g., self-cleaning or waterproof properties) can be imparted in addition to the sunlight reflection enhancing properties, e.g., especially if the coating has surface nanostructure such as nanoparticles or nanowires.

In some aspects, the disclosed technology can include structured materials, articles using disclosed structured materials, and methods to fabricate the disclosed structured materials and articles, e.g., in various clothing and non-clothing applications, including:

1. Metal nanoparticle-coated dark cloth or substrate, ceramic nanoparticle-coated cloth or substrate, and/or metal and/or ceramic plus polymer-coated cloth or substrate;
2. Coating by physical vapor deposition, e.g., including, but not limited to, sputtering, evaporation, ion beam deposition, ion implantation, coating by chemical vapor deposition, spray coating, dip coating, brush coating, soak coating;
3. Coating after the cloth is made or incorporating the exemplary sunlight-reflecting nanoparticles within the polymer fiber (e.g., as filler nanoparticles) or coating on the surface of the polymer fiber before it is woven into a cloth;
4. Using an adhesion enhancing pre-coating layer, e.g., such as Ti, Cr, or adhesive material such as epoxy or glue;
5. Nanostructures of metal, ceramic, and/or metal and/or ceramic plus polymer-coated substrate in non-cloth applications to reflect more sunlight;
6. Nanostructures of metal, ceramic, and/or metal and/or ceramic plus polymer-coated cloth or substrate in applications including garments, abaya, or special cloth applications for the purpose of metallic color;
7. Using disclosed sunlight reflecting materials for temperature lowering effect for a person wearing the cloth; and
8. Combining superhydrophobic, superhydrophilic or super-omniphobic properties (e.g., self-cleaning or waterproof properties) with the sunlight reflection enhancing properties of the disclosed materials.

The disclosed technology that can be optically transparent, translucent or opaque depending on the thickness of and the specific materials selected for the nanostructures can be utilized in various areas. In some implementations, the disclosed technology can be employed for sunlight or heat wave reflection from building or house roof top or wall. The disclosed technology of applying sunlight or IR reflecting coating on building or house roof top or wall can reduce the temperature of the building or house interior by at least $0.5°$ C., preferably by $1°$ C., even more preferably by $3°$ C.

In some implementations, the disclosed technology can be employed to sunlight or heat wave reflection from automobile body by providing nanostructures on a car body surface or windshield to minimize the interior of the cars getting very hot in the summer. The sunlight or IR reflecting coating according to the invention can be applied either on the windshield, windows, car body or on all surfaces. The optical transparency of the coating will minimally interfere with the light transmission through the windshield and windows. The disclosed technology of applying sunlight or IR reflecting coating can reduce the temperature of the automobile interior by at least $0.5°$ C., preferably by $1°$ C., even more preferably by $3°$ C.

In some implementations, the disclosed technology can be employed to sunlight or heat wave reflection from even shades. IR heat wave reflection may be an issue even in the shade near hot asphalt. For example, on a cloudy day in the city of Las Vegas or New York, there can be some unbearable heat wave with the wavelength of 2 to 10 um, well beyond sunlight wavelength or 0.3 to 1.5 um. As one comes out of air-conditioned building to the street, one will have to deal with the heat wave. In this case, by applying the disclosed to a clothing, it is possible to keep the person less hot for a while.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed are techniques and structures as described and shown, including:

1. A light reflecting material, comprising:
   a substrate; and
   nanostructures arranged on or within the substrate and including a plurality of core-shell nanoparticles,
   wherein the nanostructures are configured to reflect light from the substrate in a light spectral range,
   wherein the nanostructures include metal nanoparticles having core-shell structures, each core-shell structure having a core metal material and a shell protective material, and
   wherein the core metal material includes Ni, Co, Ti, Al, Mo, Zr, Ta, or W or a combination of any two or more of Ni, Co, Ti, Al, Mo, Zr, Ta, and W, and the shell protective material includes oxidation-resistant material including Cr2O3, Al2O3, ZrO2, HfO2, Ta2O5, Y2O3, ZnO, MgO, CaO, CrN, AlN, or ZrN or a combination of any two or more of Cr2O3, Al2O3, ZrO2, HfO2, Ta2O5, Y2O3, ZnO, MgO, CaO, CrN, AlN, and ZrN.

2. The material of claim 1, wherein the light spectral range includes at least one of infrared, near-infrared, or red visible light.

3. The material of claim 1, wherein the nanoparticles include metal nanoparticles including one or more of Ag, Au, or Pd.

4. The material of claim 1, further comprising an adhesion enhancing material having a silane structure (Si(OEt)3).

5. The material of claim 1, wherein the nanostructures configured to reflect light include a sunlight or infrared (IR) reflecting coating that exhibits a high durability of the nanoparticles adherence with one of at most 20% loss, at most 10% loss, or at most 5% loss of the adhered nanoparticles after repeated washing or repeated rubbing, with corresponding loss of superhydrophobic contact angle being one of at most 30 degrees, at most 15 degrees, or at most 5 degrees.

6. The material of claim 5, wherein:
   the at most 10% loss is more preferred than the at most 20% loss and the at most 5% loss is more preferred than the at most 10% loss; and
   the at most 15 degrees contact angle is more preferred than the at most 30 degrees contact angle and the at most 5 degrees contact angle is more preferred than the at most 15 degrees contact angle.

7. The material of claim 1, further comprising a thin film coating layer on an external surface of the substrate to enhance adhesion of the nanostructures on the substrate, the thin film coating layer including Ti, Cr, or adhesive material.

8. The material of claim 1, wherein the substrate includes a textile substrate or solid substrate.

9. The material of claim 1, wherein at least some of the nanoparticles are separated from one another with an average spacing of at least one half the average diameter of the particle.

10. The material of claim 1, wherein the substrate includes at least a portion of an enclosure housing temperature sensitive components.

11. The material of claim 10, wherein the enclosure includes metallic, ceramic, or polymer material and has a surface coated with a heat-insulating interfacial layer.

12. The material of claim 1, wherein the nanostructures having a dimension size of substantially less than a half of a visible light wavelength, and an interparticle spacing of at least one half of an average nanoparticle diameter.

13. The material of claim 1, wherein the nanostructures having a dimension size of substantially less than a half of a visible light wavelength, and an interparticle spacing of at least one half of an average nanoparticle diameter.

14. The material of claim 1, wherein the core-shell nanoparticle structure is spherical or flaky in shape.

15. The material of claim 1, wherein the shell thickness in the core-shell nanoparticle structure is in the range of 1-30 nm with the volume fraction of the shell material being less than 40%.

* * * * *